(12) United States Patent
Komatsuzaki et al.

(10) Patent No.: US 10,557,061 B2
(45) Date of Patent: *Feb. 11, 2020

(54) ADHESIVE TAPE

(71) Applicant: DIC Corporation, Tokyo (JP)

(72) Inventors: Yuki Komatsuzaki, Saitama (JP);
Takeshi Iwasaki, Saitama (JP);
Hideaki Takei, Saitama (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/368,747

(22) PCT Filed: Dec. 20, 2012

(86) PCT No.: PCT/JP2012/083072
§ 371 (c)(1),
(2) Date: Jun. 25, 2014

(87) PCT Pub. No.: WO2013/099755
PCT Pub. Date: Jul. 4, 2013

(65) Prior Publication Data
US 2014/0356615 A1  Dec. 4, 2014

(30) Foreign Application Priority Data

Dec. 26, 2011 (JP) ................................. 2011-283305

(51) Int. Cl.
*C09J 7/26* (2018.01)

(52) U.S. Cl.
CPC ............ *C09J 7/26* (2018.01); *C08J 2205/04* (2013.01); *C08J 2323/02* (2013.01);
(Continued)

(58) Field of Classification Search
CPC ... C09J 7/0289; C09J 7/0271; C09J 2201/122
See application file for complete search history.

(56) References Cited

U.S. PATENT DOCUMENTS

| | | |
|---|---|---|
| 3,717,559 A | 2/1973 | Oyama et al. |
| 4,272,468 A | 6/1981 | Slocumb |
| (Continued) | | |

FOREIGN PATENT DOCUMENTS

| | | |
|---|---|---|
| CN | 1017243 B | 7/1992 |
| CN | 1768097 A | 5/2006 |
| (Continued) | | |

OTHER PUBLICATIONS

International Search Report, dated Mar. 12, 2013, which issued during the prosecution of PCT/JP2012/083072, which corresponds to the present application.

(Continued)

*Primary Examiner* — Victor S Chang
(74) *Attorney, Agent, or Firm* — McDermott Will & Emery LLP

(57) ABSTRACT

An adhesive tape including a particular foam base is provided. An average bubble diameter in a machine direction (MD) and an average bubble diameter in a cross-machine direction (CD) of the foam base are each 150 μm or less, the ratio of the average bubble diameter in the machine direction/an average bubble diameter in a vertical direction (VD) and the ratio of the average bubble diameter in the cross-machine direction/the average bubble diameter in the vertical direction are each 6 or less, and the foam base has an interlaminar strength of 20 N/cm or more. With this adhesive tape, good followability to an adherend and excellent impact resistance can be realized. The adhesive tape of the present invention can be suitably used in portable electronic devices, such as smartphones, tablets, notebooks, and game machines, whose screen size has been increasing and for which a requirement for flexible design is high.

14 Claims, 3 Drawing Sheets

(52) U.S. Cl.
CPC .... *C09J 2201/122* (2013.01); *C09J 2201/622* (2013.01); *C09J 2203/326* (2013.01); *C09J 2423/006* (2013.01); *Y10T 428/249978* (2015.04)

(56) References Cited

U.S. PATENT DOCUMENTS

| | | | |
|---|---|---|---|
| 4,994,485 | A | 2/1991 | Dolman et al. |
| 5,784,054 | A | 7/1998 | Armstrong et al. |
| 6,350,512 | B1 | 2/2002 | Hurley et al. |
| 8,962,122 | B2* | 2/2015 | Adachi ............. B32B 5/18 428/138 |
| 2003/0207114 | A1 | 11/2003 | Atzesdorfer et al. |
| 2004/0012731 | A1* | 1/2004 | Ishiwa ............. G02F 1/13452 349/61 |
| 2004/0022046 | A1 | 2/2004 | Leerkamp et al. |
| 2005/0031858 | A1 | 2/2005 | Tachibana |
| 2005/0209380 | A1* | 9/2005 | Wada ............. C09J 133/04 524/270 |
| 2006/0177642 | A1 | 8/2006 | Tateo et al. |
| 2007/0212478 | A1 | 9/2007 | Fukunaga et al. |
| 2008/0003421 | A1 | 1/2008 | Matsumura et al. |
| 2008/0057301 | A1* | 3/2008 | Tateo et al. ............. 428/338 |
| 2009/0163626 | A1 | 6/2009 | Ukei et al. |
| 2010/0028653 | A1 | 2/2010 | Kobayashi et al. |
| 2010/0143685 | A1 | 6/2010 | Nakayama et al. |
| 2010/0249258 | A1* | 9/2010 | Uno ............. B29C 44/5627 521/142 |
| 2011/0300361 | A1 | 12/2011 | Nakayama et al. |
| 2012/0164414 | A1 | 6/2012 | Nakayama et al. |
| 2013/0235514 | A1 | 9/2013 | Tateo et al. |
| 2013/0309483 | A1 | 11/2013 | Watanabe et al. |
| 2014/0356615 | A1 | 12/2014 | Komatsuzaki et al. |

FOREIGN PATENT DOCUMENTS

| | | |
|---|---|---|
| CN | 201013648 Y | 1/2008 |
| CN | 101724355 A | 6/2010 |
| CN | 101747847 A | 6/2010 |
| CN | 101857780 A | 10/2010 |
| CN | 102268230 A | 12/2011 |
| CN | 104053734 A | 9/2014 |
| EP | 0234622 A1 | 9/1987 |
| EP | 1645589 A1 | 4/2006 |
| JP | H01-174542 A | 7/1989 |
| JP | 05-102374 A | 4/1993 |
| JP | 06-350000 A | 12/1994 |
| JP | 2002-353614 A | 12/2002 |
| JP | 2004-323842 A | 11/2004 |
| JP | 2006-080473 A | 3/2006 |
| JP | 2007-194401 A | 8/2007 |
| JP | 2008-081645 A | 4/2008 |
| JP | 2009-108314 A | 5/2009 |
| JP | 2009-241482 A | 10/2009 |
| JP | 2010-001364 A | 1/2010 |
| JP | 2010/013648 A | 1/2010 |
| JP | 2010-155969 A | 7/2010 |
| JP | 2010-215906 A | 9/2010 |
| JP | 2010-260880 A | 11/2010 |
| JP | 2011-093619 A | 5/2011 |
| JP | 2011-168727 A | 9/2011 |
| JP | 2011-252095 A | 12/2011 |
| JP | 2012-072347 A | 4/2012 |
| JP | 2012-072393 A | 4/2012 |
| JP | 2012-152955 A | 8/2012 |
| JP | 2012-214623 A | 11/2012 |
| JP | 2012-214626 A | 11/2012 |
| JP | 2012-214800 A | 11/2012 |
| JP | 2013-053179 A | 3/2013 |
| JP | 5517015 B1 | 6/2014 |
| KR | 20100084505 A | 7/2010 |
| TW | 201037053 A | 10/2010 |
| WO | 2005007731 A1 | 1/2005 |
| WO | 2009/044690 A1 | 4/2009 |
| WO | 2013176031 A1 | 11/2013 |

OTHER PUBLICATIONS

Third Party Observation, submitted Nov. 19, 2013, which issued during the prosecution of International Patent Application No. PCT/JP2013/057487.
International Search Report, dated Jul. 16, 2013, which issued during the prosecution of International Application No. PCT/JP2013/060844.
International Search Report dated Jul. 9, 2013, which issued during the prosecution of International Patent Application No. PCT/JP2013/063655.
International Search Report, dated Jun. 18, 2013, which issued during the prosecution of International Patent Application No. PCT/JP2013/057487, with English language translation.
International Search Report dated Sep. 22, 2008, which issued during the prosecution of International Patent Application No. PCT/JP2008/002258.
International Search Report, dated Jul. 16, 2013, which issued during the prosecution of International Application No. PCT/JP2013/060844, which corresponds to the present application.
Third Party Observation, submitted Nov. 19, 2013, which issued during the prosecution of International Patent Application No. PCT/JP2013/060844.
IVritten Opinion and International Search Report Issued in connection with PCT Application No. PCT/US2009/003235 dated Jan. 19, 2010.
Extended European Search Report and Preliminary Opinion, European Patent Application No. 09762841.6, dated Jul. 22, 2011.
Non-final Office Action dated May 23, 2012, issued in corresponding U.S. Appl. No. 12/672,876.
Non-final Office Action dated Dec. 24, 2015, issued in corresponding U.S. Appl. No. 14/400,918.
Final Office Action dated Apr. 7, 2016, issued in corresponding U.S. Appl. No. 14/400,918.
Non-final Office Action dated Oct. 5, 2016, issued in corresponding U.S. Appl. No. 14/400,918.
Final OA dated mailed Apr. 17, 2017, issued in corresponding U.S. Appl. No. 14/400,918.
Final Office Action dated Jan. 18, 2017, issued in corresponding U.S. Appl. No. 14/394,047.
Non-final Office Action dated Aug. 22, 2016, issued in corresponding U.S. Appl. No. 14/394,047.
Final Office Action dated Feb. 4, 2016, issued in corresponding U.S. Appl. No. 14/394,047.
Non-final Office Action dated Oct. 7, 2015, issued in corresponding U.S. Appl. No. 14/394,047.
Non-Final Office Action dated Feb. 13, 2015, issued in corresponding U.S. Appl. No. 14/387,155.
Final Office Action dated Jun. 19, 2015, issued in corresponding U.S. Appl. No. 14/387,155.
Non-Final Office Action dated Nov. 5, 2015, issued corresponding in U.S. Appl. No. 14/387,155.
Final Office Action dated May 9, 2016, issued in corresponding U.S. Appl. No. 14/387,155.
Non-Final Office Action dated Dec. 16, 2016, issued in corresponding U.S. Appl. No. 14/387,155.
Final Office Action dated May 5, 2017, issued in corresponding U.S. Appl. No. 14/387,155.
U.S. Office Action issued in U.S. Appl. No. 14/387,155 dated Apr. 17, 2018.

* cited by examiner

ADHESIVE TAPE

CROSS REFERENCE TO PRIOR APPLICATIONS

This application is a U.S. National Phase application under 35 U.S.C. § 371 of International Application No. PCT/JP2012/083072, filed on Dec. 20, 2012 and claims benefit of priority to Japanese Patent Application No. 2011-283305, filed on Dec. 26, 2011. The International Application was published in Japanese on Jul. 4, 2013 as WO 2013/099755 A1 under PCT Article 21(2). The contents of the above applications are hereby incorporated by reference.

TECHNICAL FIELD

The present invention relates to an adhesive tape that includes a foam base.

BACKGROUND ART

In portable electronic devices such as electronic notebooks, cellular phones, personal handyphone systems (PHS), digital cameras, music players, televisions, notebook personal computers, and game machines, adhesive tapes are used for fixing various members or modules, for example, for bonding a housing to a panel that protects an information display unit such as a liquid crystal display (LCD) or an organic electroluminescence display (OELD). Many of these portable electronic devices are provided with waterproofness. In such portable electronic devices, waterproofness is achieved by using an adhesive tape for fixing members.

For example, adhesive tapes that use a flexible foam as a base are disclosed as adhesive tapes having a waterproof performance (refer to PTL 1 and PTL 2). It is disclosed that since these adhesive tapes have small thicknesses and good followability, the adhesive tapes can be suitably used for providing portable electronic devices with waterproofness.

However, regarding recent portable electronic devices such as smartphones, tablet personal computers, notebook personal computers, and game machines, the screen size of an information display unit of such a portable electronic device has been increasing. In addition, there is a high demand for adhesive tapes that have small widths and that can fix protective panels of information display units or information display device modules for the purpose of improving the degree of freedom of the information display units. In the fixation of information display units having large screen sizes or panels that protect the information display units and in the fixation of protective panels or information display device modules using an adhesive tape having a small width, the above-described adhesive tapes become easily separated when an impact due to falling or the like is applied. Thus, an improvement in impact resistance has been desired.

PTL 1: Japanese Unexamined Patent Application Publication No. 2010-155969
PTL 2: Japanese Unexamined Patent Application Publication No. 2010-260880

DISCLOSURE OF INVENTION

Technical Problem

An object to be achieved by the present invention is to provide an adhesive tape having good followability to an adherend and excellent impact resistance.

Solution to Problem

In the present invention, an adhesive tape includes a particular foam base. An average bubble diameter in a machine direction (MD) and an average bubble diameter in a cross-machine direction (CD) of the foam base are each 150 μm or less, a ratio represented by the average bubble diameter in the machine direction/an average bubble diameter in a vertical direction (VD) and a ratio represented by the average bubble diameter in the cross-machine direction/the average bubble diameter in the vertical direction are each 6 or less, and the foam base has an interlaminar strength of 20 N/cm or more. With this adhesive tape, good followability to an adherend and excellent impact resistance can be realized. The above object was achieved as a result of this finding.

Advantageous Effects of Invention

The adhesive tape of the present invention has good followability to an adherend because a particular foam base is used. Therefore, the adhesive tape can effectively prevent water and dust from entering from a gap in a close contact portion, and thus has excellent waterproofness, an excellent drip-proof property, and excellent dust resistance. Accordingly, waterproofness, a drip-proof property, and dust resistance can be effectively provided even to portable electronic devices whose thicknesses have been decreasing, in which the space in a housing is strictly limited, and for which it is difficult to provide separate sealing means. Furthermore, since the foam base having a particular interlaminar strength is used, the adhesive tape has excellent impact resistance at the time of falling. Accordingly, even in the fixation of an information display unit having a large screen size or a large protective panel that protects the information display unit, and in the fixation of a panel or an information display device itself with an adhesive tape having a small width, separation of the adhesive tape and cracking of the foam base do not easily occur at the time of falling. Thus, the adhesive tape of the present invention can be suitably used in portable electronic devices, such as smartphones, tablet personal computers, notebook personal computers, and game machines whose screen size has been increasing and for which a requirement for flexible design is high.

DESCRIPTION OF EMBODIMENTS

Figure 1:
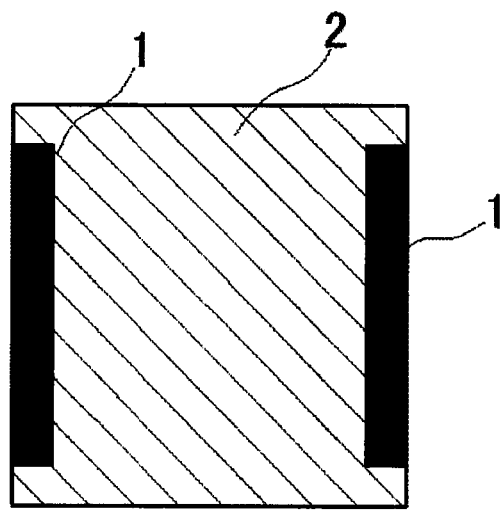
FIG. 1 is a schematic view illustrating a test piece for a surface adhesive strength.

An adhesive tape of the present invention includes a foam base and an adhesive layer disposed on the foam base. An average bubble diameter in a machine direction (MD, a direction in which a sheet is extruded or a direction in which a foam base is unwound) and an average bubble diameter in a cross-machine direction (CD, a direction orthogonal to the MD and along a surface of the foam base) of the foam base are each 150 µm or less. A ratio represented by the average bubble diameter in the machine direction/an average bubble diameter in a vertical (i.e., thickness) direction (VD, a direction orthogonal to a surface of the foam base) and a ratio represented by the average bubble diameter in the cross-machine direction/the average bubble diameter in the vertical direction are each 6 or less. The foam base has an interlaminar strength of 20 N/cm or more.

[Foam Base]

A foam base used in the present invention has an interlaminar strength of 20 N/cm or more, preferably 20 to 150 N/cm, more preferably 25 to 100 N/cm, and still more preferably 25 to 60 N/cm. By using a foam having an interlaminar strength in the above range, good followability to an adherend and excellent impact resistance can be realized. Furthermore, it is possible to provide ease of peeling of the adhesive tape even in the case where an adhesive tape, a component, or the like is peeled off (re-worked) from a workpiece for the purpose of improving the yield during the production of a portable electronic device, or even in the case where interlaminar cracking of the base is generated when a housing or a component is separated, disassembled, or dismantled for the purpose of repairing, reproducing, or reusing a finished product.

The interlaminar strength is measured by a method described below. A foam base whose interlaminar strength is to be evaluated is prepared. An adhesive layer which has a thickness of 50 µm and a strong adhesiveness (and which is not separated from an adherend and the foam base during a high-speed peeling test described below) is bonded to each surface of the foam base. Subsequently, the resulting foam base is aged at 40° C. for 48 hours to prepare a double-sided adhesive tape for measuring the interlaminar strength. Next, one adhesive surface of the double-sided adhesive tape is lined with a polyester film having a thickness of 25 µm, thus preparing a double-sided adhesive tape sample having a width of 1 cm and a length of 15 cm (in the machine direction and the cross-machine direction of the foam base). The double-sided adhesive tape sample is attached to a polyester film having a thickness of 50 µm, a width of 3 cm, and a length of 20 cm at 23° C. and at 50% RH under pressure by using a 2-kg roller so as to reciprocate once, and is allowed to stand at 60° C. for 48 hours. The resulting sample is allowed to stand at 23° C. for 24 hours. Subsequently, a surface which has been attached to the polyester film having a thickness of 50 µm at 23° C. and at 50% RH is fixed to an attachment jig of a high-speed peel testing machine. The foam is torn by drawing the polyester film having a thickness of 25 µm at a tensile speed of 15 m/min in a direction of 90 degrees. The maximum strength at this time is measured.

The moduli of elasticity in tension in the machine direction and in the cross-machine direction of the foam base used in the present invention are not particularly limited. However, the moduli of elasticity in tension are each preferably 500 N/cm$^2$ or more, and more preferably 600 to 1,500 N/cm$^2$. Out of the modulus of elasticity in tension in the machine direction and the modulus of elasticity in tension in the cross-machine direction, the lower modulus of elasticity in tension is preferably 500 to 800 N/cm$^2$, and more preferably 600 to 700 N/cm$^2$. In this case, the higher modulus of elasticity in tension is preferably 700 to 1,500 N/cm$^2$, and more preferably 800 to 1,100 N/cm$^2$. The tensile elongation at the time of breaking in a tensile test is not particularly limited. However, the tensile elongation in the machine direction is preferably 200% to 1,500%, more preferably 400% to 1,000%, still more preferably 620% to 950%, and particularly preferably 650% to 700%. When the foam base has a modulus of elasticity in tension and a tensile elongation in the above ranges, degradation of the processability of the adhesive tape and a decrease in the workability of attachment of the adhesive tape can be suppressed even in the case where the base is a foamed, flexible base. In addition, interlaminar fracture and tearing of the foam are not easily generated when the adhesive tape is peeled off. Even in the case where interlaminar cracking is generated, ease of peeling of the adhesive tape can be provided.

The moduli of elasticity in tension in the machine direction and in the cross-machine direction of the foam base were measured in accordance with JIS K6767. The moduli of elasticity in tension are each a maximum strength measured by using a sample having a length of a reference line of 2 cm and a width of 1 cm with a Tensilon tensile tester in an environment at 23° C. and at 50% RH under a measuring condition of a tensile speed of 300 mm/min.

The bubble structure of the foam base used in the present invention is preferably an independent bubble structure because entering of water from a cut surface of the foam base can be effectively prevented. Regarding the shape of bubbles forming the independent bubble structure, independent bubbles each preferably have a shape in which the average bubble diameter in the machine direction or in the cross-machine direction or the average bubble diameters in both the machine direction and the cross-machine direction are larger than the average bubble diameter in the vertical direction of the foam base. This is because the foam base has moderate followability and cushioning properties.

The average bubble diameters in the machine direction and the cross-machine direction of the foam base used in the present invention are each 150 µm or less, preferably 10 to 150 µm, more preferably 30 to 150 µm, and still more preferably 50 to 150 µm. When the average bubble diameters in the machine direction and in the cross-machine direction are in the above range, the number of independent bubbles that are present per unit width is increased even in the case where the width of the adhesive tape is reduced. Thus, paths of water that enters from a cross section of the foam base can be suitably blocked.

The average bubble diameter in the vertical direction of the foam base used in the present invention is 1 to 150 µm, preferably 5 to 100 µm, and more preferably 10 to 60 µm, though it depends on the thickness of the foam.

In the foam base used in the present invention, a ratio of the average bubble diameter in the machine direction of the foam base to the average bubble diameter in the vertical direction of the foam base (average bubble diameter in machine direction/average bubble diameter in vertical direction) and a ratio of the average bubble diameter in the cross-machine direction of the foam base to the average bubble diameter in the vertical direction of the foam base (average bubble diameter in cross-machine direction/average bubble diameter in vertical direction) are each 6 or less, more preferably 1.2 to 5.5, and still more preferably 1.2 to 4. When each of the ratios is 1.2 or more, flexibility in the vertical direction is easily ensured, and thus followability is improved. When each of the ratios is 6 times or less, durability to interlaminar fracture of the foam due to the impact of falling is significantly improved. In addition, variations in the flexibility and the tensile strength in the machine direction and in the cross-machine direction of the foam base are not easily generated. An adhesive tape that includes a foam base having the above ratios of the average bubble diameters has preferable followability and cushioning properties in the vertical direction. Therefore, the pressure at the time of attachment is concentrated at a joined portion, and air present at the adhesion interface is easily pushed out. Thus, even in the joint between rigid components, excellent adhesiveness can be realized in which a gap where water may enter is not generated.

Furthermore, a ratio of the average bubble diameter in the machine direction to the average bubble diameter in the cross-machine direction is not particularly limited. However, when the average bubble diameter in the machine direction is assumed to be 1, the ratio is preferably 0.25 to 4 times, more preferably 0.33 to 3 times, still more preferably 0.6 to 1.5 times, and particularly preferably 0.7 to 1.3 times. When the ratio is in the above range, variations in the flexibility and the tensile strength in the machine direction and in the cross-machine direction of the foam base are not easily generated.

An average bubble diameter in the cross-machine direction, an average bubble diameter in the machine direction, and an average bubble diameter in the vertical direction of a foam base are measured by a method described below. First, the foam base is cut so as to have a dimension in the cross-machine direction of 1 cm and a dimension in the machine direction of 1 cm. Next, a bubble portion in a central portion of a cross section of the cut foam base is enlarged at a magnification of 200 by using a digital microscope (trade name "KH-7700", manufactured by HiROX Co., Ltd.). Subsequently, a cross section in the cross-machine direction or the machine direction of the foam base is observed over the entire length in the vertical direction of the foam base. In the obtained enlarged image, the bubble diameters of all bubbles that are present on a cross section corresponding to an actual length of 2 mm before the magnification in the cross-machine direction or the machine direction are measured. An average bubble diameter is calculated from the average of the bubble diameters. An average bubble diameter is determined from the results measured at 10 arbitrary positions.

The apparent density of the foam base is not particularly limited. However, the apparent density of the foam base is 0.08 to 0.7 g/cm$^3$, preferably 0.1 to 0.6 g/cm$^3$, more preferably 0.2 to 0.5 g/cm$^3$, and particularly preferably 0.3 to 0.5 because both the impact resistance and excellent adhesiveness to an adherend are easily realized by adjusting the interlaminar strength, the compressive strength, the average bubble diameters, etc. to the ranges described above. The apparent density was measured in accordance with JIS K6767. Samples each having a rectangular shape of 4 cm×5 cm are prepared by cutting a foam base so that the total volume of the samples becomes about 15 cm$^3$. The mass of the samples is measured, and the apparent density of the samples is determined.

The 25% compressive strength of the foam base used in the present invention is not particularly limited. However, the foam base has a 25% compressive strength of 80 to 700 kPa, preferably 170 to 600 kPa, and more preferably 270 to 500 kPa. When a foam base having a 25% compressive strength in the above range is used, excellent adhesiveness to an adherend is obtained, and, in particular, the foam base suitably follows an adherend having an irregular shape or a rough surface and excellent adhesiveness is obtained.

The 25% compressive strength was measured in accordance with JIS K6767. Samples are prepared by cutting a foam base so as to have a 25 square shape. The samples are stacked until the thickness becomes about 10 mm. The samples are then sandwiched between stainless sheets each having an area larger than that of the samples. The samples are compressed by about 2.5 mm (corresponding to 25% of the original thickness) at a rate of 10 mm/min at 23° C. The strength at this time is measured.

The thickness of the foam base may be appropriately adjusted in accordance with an embodiment to be used, but is 50 to 1,200 µm. For fixing a component of an electronic device, in particular, in the case of a portable electronic device having a small size and a small thickness, a small tape thickness is required. Therefore, the thickness of the base is preferably 50 to 1,000 µm.

The interlaminar strength, the compressive strength, the modulus of elasticity in tension, etc. of the foam base can be adjusted by appropriately selecting the material and the foam structure of the base used. The material of the foam base used in the present invention is not particularly limited as long as the material has the interlaminar strength, the 25% compressive strength, the modulus of elasticity in tension, etc. described above. Examples of the material of the foam base that can be used include polyolefin foams composed of polyethylene, polypropylene, an ethylene-propylene copolymer, an ethylene-vinyl acetate copolymer, or the like; polyurethane foams; and rubber foams composed of an acrylic rubber, another elastomer, or the like. Among these, polyolefin foams are preferably used because it is possible to easily prepare a thin foam base having an independent bubble structure, and having excellent followability to irregularities on a surface of an adherend, an excellent shock absorbing property, etc.

Among polyolefin foams that use a polyolefin resin, a polyethylene resin is preferably used because a foam base having a uniform thickness is easily produced and preferable flexibility is easily provided. The content of the polyethylene resin in the polyolefin resin is preferably 40% by mass or more, more preferably 50% by mass or more, still more preferably 60% by mass or more, and particularly preferably 100% by mass.

A polyethylene resin obtained by using, as a polymerization catalyst, a metallocene compound containing a tetravalent transition metal is preferably used as the polyethylene resin used in the polyolefin foam. In this case, the polyolefin foam can be uniformly cross-linked because the polyethylene resin has a narrow molecular-weight distribution and, in the case of a copolymer, a comonomer is introduced at the substantially same proportion in any molecular-weight component. Accordingly, since the foamed sheet is uniformly cross-linked, the foamed sheet is easily uniformly stretched as required. Thus, the thickness of the resulting polyolefin resin foam can be made easily uniform as a whole.

Furthermore, the polyolefin resin constituting the polyolefin foam may contain a polyolefin resin other than the polyethylene resin obtained by using, as a polymerization catalyst, a metallocene compound containing a tetravalent transition metal. Examples of such a polyolefin resin include polyethylene resins other than the above polyethylene resin, and polypropylene resins. The polyolefin resins may be used alone or in combination of two or more resins.

Examples of the polyethylene resins include linear low-density polyethylenes, low-density polyethylenes, intermediate-density polyethylenes, high-density polyethylenes, ethylene-α-olefin copolymers containing 50% by weight or more of ethylene, and ethylene-vinyl acetate copolymers containing 50% by weight or more of ethylene. There may be used alone or in combination of two or more resins. Examples of the α-olefin contained in the ethylene-α-olefin copolymers include propylene, 1-butene, 1-pentene, 4-methyl-1-pentene, 1-hexene, 1-heptene, and 1-octene.

Examples of the polypropylene resins include, but are not particularly limited to, polypropylene, and propylene-α-olefin copolymers containing 50% by weight or more of propylene. These may be used alone or in combination of two or more resins. Examples of the α-olefin contained in the propylene-α-olefin copolymers include ethylene, 1-butene, 1-pentene, 4-methyl-1-pentene, 1-hexene, 1-heptene, and 1-octene.

The polyolefin foam may be cross-linked. In the case where a foamable polyolefin resin sheet is foamed by using a thermal decomposition-type foaming agent, the polyolefin foam is preferably cross-linked. The degree of cross-linking is preferably 5% to 60% by mass, and more preferably 20% to 55% by mass. When the degree of cross-linking is excessively small, in the case where the foam base is stretched, bubbles in the vicinity of a surface of the foamed sheet are broken, and roughening of the surface occurs. Consequently, adhesiveness with an acrylic adhesive layer may decease. When the degree of cross-linking is excessively large, a melt viscosity of the resulting foamable polyolefin resin composition described below becomes excessively high. Consequently, when the foamable polyolefin resin composition is foamed by heating, the foamable polyolefin resin composition is difficult to follow the foaming, and a cross-linked polyolefin resin foamed sheet having a desired foaming magnification is not obtained. As a result, a shock absorbing property is degraded.

Next, a method for producing a polyolefin resin foam will be described. The method for producing a polyolefin resin foam is not particularly limited. An example of the method includes the steps of supplying, to an extruder, a foamable polyolefin resin composition that contains a polyolefin resin containing 40% by weight or more of a polyethylene resin obtained by using, as a polymerization catalyst, a metallocene compound containing a tetravalent transition metal, a thermal decomposition-type foaming agent, a foaming aid, and a colorant for coloring the resulting foam to black, white, or the like, melt-kneading the foamable polyolefin resin composition, and extruding the kneaded resin composition from an extruder into a sheet to produce a foamable polyolefin resin sheet; cross-linking the foamable polyolefin resin sheet; foaming the foamable polyolefin resin sheet; melting or softening the resulting foamed sheet, and stretching the foamed sheet in either the machine direction or the cross-machine direction or in both the machine direction and the cross-machine direction to stretch the foamed sheet. The step of stretching the foamed sheet may be performed as required. Alternatively, the step of stretching the foamed sheet may be performed a plurality of times.

Examples of the method for cross-linking the polyolefin resin foam base include a method including irradiating a foamable polyolefin resin sheet with ionizing radiation; and a method including blending an organic peroxide with a foamable polyolefin resin composition in advance, and heating the resulting foamable polyolefin resin sheet to decompose the organic peroxide. These methods may be used in combination.

Examples of the ionizing radiation include electron beams, α rays, β rays, and γ rays. The dose of the ionizing radiation is appropriately adjusted so that a gel fraction of the polyolefin resin foam base is in the above preferable range. The dose of the ionizing radiation is preferably in the range of 5 to 200 kGy. From the viewpoint that a uniform foamed state is easily obtained, both surfaces of the foamable polyolefin resin sheet are preferably irradiated with ionizing radiation, and the dose of the ionizing radiation on one surface is preferably the same as that on another surface.

Examples of the organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butylperoxide, t-butyl cumylperoxide, dicumylperoxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumylperoxy neodecanate, t-butylperoxy benzoate, 2,5-dimethyl-2,5-di(benzoylperoxy)hexane, t-butylperoxyisopropyl carbonate, and t-butylperoxyallyl carbonate. These may be used alone or in combination of two or more organic peroxides.

The amount of organic peroxide added is preferably 0.01 to 5 parts by weight, and more preferably 0.1 to 3 parts by weight relative to 100 parts by weight of the polyolefin resin. When the amount of organic peroxide is excessively small, cross-linking of the foamable polyolefin resin sheet may be insufficient. When the amount of organic peroxide is excessively large, a decomposition residue of the organic peroxide may remain in the resulting cross-linked polyolefin resin foamed sheet.

The amount of thermal decomposition-type foaming agent added in the foamable polyolefin resin composition may be appropriately determined in accordance with the foaming magnification of the polyolefin resin foam base. The amount of thermal decomposition-type foaming agent is preferably 1 to 40 parts by weight, and more preferably 1 to 30 parts by weight relative to 100 parts by weight of the polyolefin resin. When the amount of thermal decomposition-type foaming agent is excessively small, a foaming property of the foamable polyolefin resin sheet is decreased, and a polyolefin resin foam base having a desired foaming magnification may not be obtained. When the amount of thermal decomposition-type foaming agent is excessively large, the tensile strength and compression restorability of the resulting polyolefin resin foam base may be decreased.

Examples of the method for foaming the foamable polyolefin resin sheet include, but are not particularly limited to, a method including heating with hot air, a method including heating by infrared rays, a method using a salt bath, and a method using an oil bath. These methods may be used in combination. Among these methods, the method including heating with hot air and the method including heating by infrared rays are preferable because the difference in the appearance between the front surface and the back surface of the resulting polyolefin resin foam base.

The foaming magnification of the foam base is not particularly limited. However, the foaming magnification of the foam base is 2 to 12 times, preferably 2 to 8 times, and more preferably 2 to 5 times because both the impact resistance and excellent adhesiveness to an adherend are easily realized by adjusting the interlaminar strength, the compressive strength, the apparent density, the average bubble diameters, etc. to the ranges described above.

The stretching of the foam base may be performed after a foamable polyolefin resin sheet is foamed to obtain a foam base. Alternatively, the stretching of the foam base may be performed while a foamable polyolefin resin sheet is foamed. In the case where a foamable polyolefin resin sheet is foamed to obtain a foam base and the foam base is then stretched, the foam base may be continuously stretched while maintaining the molten state during foaming without cooling the foam base. Alternatively, in such a case, after the foam base is cooled, the resulting foamed sheet may be heated to be in a molten or softened state and the foam base may then be stretched.

Herein, the term "molten state of a foam base" refers to a state in which the foam base is heated so that the temperature of both surfaces thereof is increased to the melting point of a polyolefin resin constituting the foam base or higher. The term "softening of a foam base" refers to a state in which the foam base is heated so that the temperature of both surfaces thereof is increased to a temperature of 20° C. or higher and lower than the melting point of a polyolefin resin constituting the foam base. By stretching the foam base, bubbles in the foam base are stretched in a predetermined direction and deformed. Thus, it is possible to produce a polyolefin foam in which the aspect ratio of the bubbles is in a predetermined range.

Furthermore, regarding a stretching direction of a foam base, stretching is performed in the machine direction or the cross-machine direction of a long foamable polyolefin resin sheet, or in the machine direction and the cross-machine direction of a long foamable polyolefin resin sheet. In the case where a foam base is stretched in the machine direction and the cross-machine direction, the foam base may be simultaneously stretched in the machine direction and the cross-machine direction or separately stretched in each of the directions.

Examples of the method for stretching the foam base in the machine direction include a method for stretching the foam base in the machine direction, the method including making a speed (take-up speed) of taking up a long foamed sheet while cooling after foaming faster than a speed (feed speed) of feeding a long foamable polyolefin resin sheet to the foaming step; and a method for stretching the foam base in the machine direction, the method including making a speed (take-up speed) of taking up a foam base faster than a speed (feed speed) of feeding the foam base to the stretching step.

Note that, in the former method, the foamable polyolefin resin sheet is expanded in the machine direction as a result of foaming of the resin sheet itself. Accordingly, in the case where the foam base is stretched in the machine direction, it is necessary to adjust the feed speed and the take-up speed of the foam base in consideration of the amount of expansion in the machine direction as a result of foaming of the foamable polyolefin resin sheet so that the foam base is stretched in the machine direction by an amount larger than the amount of expansion.

The method for stretching the foam base in the cross-machine direction is preferably a method for stretching the foam base in the cross-machine direction, the method including holding both ends of the foam base in the cross-machine direction with a pair of holding members, and gradually moving the pair of holding members in directions in which the holding members are separated from each other. Note that the foamable polyolefin resin sheet is expanded in the cross-machine direction as a result of foaming of the resin sheet itself. Accordingly, in the case where the foam base is stretched in the cross-machine direction, it is necessary to perform adjustment in consideration of the amount of expansion in the cross-machine direction as a result of foaming of the foamable polyolefin resin sheet so that the foam base is stretched in the cross-machine direction by an amount larger than the amount of expansion.

Herein, the stretch ratio of a polyolefin foam in the machine direction is preferably 1.1 to 2.0 times, and more preferably 1.2 to 1.5 times. When the stretch ratio of the polyolefin foam in the machine direction is excessively small, the flexibility and tensile strength of the polyolefin resin foam base may be decreased. When the stretch ratio of the polyolefin foam in the machine direction is excessively large, the foam base may be cut during stretching or a foaming gas is escaped from the foam base during foaming, resulting in a significant decrease in the foaming magnification of the polyolefin resin foam base. Consequently, the flexibility and tensile strength of the polyolefin resin foam base may be decreased, and the quality of the polyolefin resin foam base may become uneven.

The stretch ratio of a polyolefin foam base in the cross-machine direction is preferably 1.2 to 4.5 times, and more preferably 1.5 to 3.5 times. When the stretch ratio of the polyolefin foam base in the cross-machine direction is excessively small, the flexibility and tensile strength of the polyolefin resin foam base may be decreased. When the stretch ratio of the polyolefin foam base in the cross-machine direction is excessively large, the foam base may be cut during stretching or a foaming gas is escaped from the foam base during foaming, resulting in a significant decrease in the foaming magnification of the polyolefin resin foam base. Consequently, the flexibility and tensile strength of the polyolefin foam base may be decreased, and the quality of the polyolefin foam base may become uneven.

The foam base may be colored for the purpose of exhibiting a design property, a light-shielding property, a concealing property, a light-reflecting property, and lightfastness in the adhesive tape. Colorants may be used alone or in combination of two or more colorants.

In the case where a light-shielding property, a concealing property, and lightfastness are provided to an adhesive tape, the foam base is colored in black. Examples of black colorants that can be used include carbon black, graphite, copper oxide, manganese dioxide, aniline black, perylene black, titanium black, cyanine black, activated carbon, ferrite, magnetite, chromium oxide, iron oxide, molybdenum disulfide, chromium complexes, compound oxide-based black colorants, and anthraquinone-based organic black colorants. Among these, carbon black is preferable from the viewpoint of the cost, availability, insulating property, and heat resistance for withstanding the temperatures in a step of extruding a foamable polyolefin resin composition and in a step of foaming by heating.

In the case where a design property, a light-reflecting property, and the like are provided to an adhesive tape, the foam base is colored in white. Examples of white colorants that can be used include inorganic white colorants such as titanium oxide, zinc oxide, aluminum oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminum hydroxide, magnesium hydroxide, calcium hydroxide, zinc hydroxide, aluminum silicate, calcium silicate, barium sulfate, calcium sulfate, barium stearate, zinc white, talc, silica, alumina, clay, kaolin, titanium phosphate, mica, gypsum, white carbon, diatomaceous earth, bentonite, lithopone, zeolite, and sericite; and organic white colorants such as silicone resin particles, acrylic resin particles, urethane resin particles, and melamine resin particles. Among these, aluminum oxide and zinc oxide are preferable from the viewpoint of the cost, availability, color tone, and heat resistance for withstanding the temperatures in a step of extruding a foamable polyolefin resin composition and in a step of foaming by heating.

The foamable polyolefin resin composition may optionally contain known additives such as plasticizers, antioxidants, foaming aids, e.g., zinc oxide, bubble nucleation adjusting agents, thermal stabilizers, flame retardants, e.g., aluminum hydroxide and magnesium hydroxide, antistatic agents, fillers, e.g., hollow balloons and beads composed of glass or a plastic, metal powders, and metal compounds, electrically conductive fillers, and thermally conductive fillers as long as physical properties of the polyolefin resin foam base are not impaired. Regarding the polyolefin resin foam base used in the adhesive tape of the present invention, in order to maintain moderate followability and cushioning properties, the content of the additives is preferably 0.1% to 10% by mass, and more preferably 1% to 7% by mass relative to the polyolefin resin.

In the case where the colorants, the thermal decomposition-type foaming agents, the foaming aids, and the like are blended in the foamable polyolefin resin composition, from the viewpoint of preventing the generation of an uneven color, abnormal foaming, and foaming defects, these components are preferably prepared in advance in the form of a masterbatch including a foamable polyolefin resin composition or a thermoplastic resin having high compatibility with the foamable polyolefin resin composition before the components are fed to an extruder.

In order to improve adhesiveness with an adhesive layer or other layers, the foam base may be subjected to a surface treatment such as a corona treatment, a flame treatment, a plasma treatment, a hot-air treatment, an ozone/ultraviolet light treatment, application of an adhesion-facilitating treatment agent, or the like. The surface treatment is performed so that a wetting index determined by using a wetting reagent becomes 36 mN/m or more, preferably 40 mN/m, and more preferably 48 mN/m. In this case, good adhesiveness with an adhesive is obtained. The foam base having improved adhesiveness may be attached to an adhesive layer in a continuous process. Alternatively, the foam base having improved adhesiveness may be temporarily subjected to a take-up process. In the case where the foam base is temporarily taken up, the foam base is preferably taken up together with a slip sheet such as paper or a film composed of polyethylene, polypropylene, polyester, or the like in order to prevent a blocking phenomenon between foam bases, which have improved adhesiveness. A polypropylene film or polyester film having a thickness of 25 μm or less is preferable.

[Adhesive Layer]

An adhesive composition used in common adhesive tapes can be used as an adhesive composition that constitutes an adhesive layer of the adhesive tape of the present invention. Examples of the adhesive composition include (meth)acrylic adhesives, urethane adhesives, synthetic rubber adhesives, natural rubber adhesives, and silicone adhesives. (Meth) acrylic adhesive compositions containing, as a base polymer, a (meth)acrylate alone or an acrylic copolymer composed of a copolymer of a (meth)acrylate and other monomers, and, as required, additives such as a tackifying resin and a cross-linking agent can be preferably used.

Examples of (meth)acrylates having 1 to 12 carbon atoms include monomers such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth) acrylate, cyclohexyl (meth)acrylate, and 2-ethylhexyl (meth)acrylate. These may be used alone or in combination of two or more monomers. Among these, (meth)acrylates whose alkyl group has 4 to 12 carbon atoms are preferable, and (meth)acrylates having a linear or branched structure having 4 to 8 carbon atoms are more preferable. In particular, n-butyl acrylate is preferable because adhesiveness to an adherend is easily obtained and n-butyl acrylate is excellent in terms of cohesive force and resistance to sebum or the like.

The content of a (meth)acrylate having 1 to 12 carbon atoms in the acrylic copolymer is preferably 80% to 98.5% by mass, and more preferably 90% to 98.5% by mass of monomer components that constitute the acrylic copolymer.

The acrylic copolymer used in the present invention may be prepared by copolymerizing a highly polar vinyl monomer. Examples of the highly polar vinyl monomer include vinyl monomers having a hydroxyl group, vinyl monomers having a carboxyl group, and vinyl monomers having an amide group. There may be used alone or in combination of two or more monomers.

Examples of the monomers having a hydroxyl group and capable of being used include hydroxyl group-containing (meth)acrylates such as 2-hydroxyethyl (meth)acrylate, 2-hydroxypropyl (meth)acrylate, 4-hydroxybutyl (meth) acrylate, and 6-hydroxyhexyl (meth)acrylate.

Examples of the vinyl monomers having a carboxyl group and capable of being used include acrylic acid, methacrylic acid, itaconic acid, maleic acid, (meth)acrylic acid dimer, crotonic acid, and ethylene oxide-modified succinic acid acrylate. Among these, acrylic acid is preferably used as a comonomer.

Examples of the monomer having an amide group include N-vinylpyrrolidone, N-vinylcaprolactam, acryloylmorpholine, acrylamide, and N,N-dimethylacrylamide.

Examples of other highly polar vinyl monomers include vinyl acetate, ethylene oxide-modified succinic acid acrylate, and sulfonic group-containing monomers such as 2-acrylamide-2-methylpropane sulfonic acid.

The content of the highly polar vinyl monomer is preferably 1.5% to 20% by mass, more preferably 1.5% to 10% by mass, and still more preferably 2% to 8% by mass of the monomer components that constitute the acrylic copolymer. When the highly polar vinyl monomer is incorporated in this range, a cohesive force, a holding force, and adhesiveness of an adhesive are easily adjusted to preferable ranges.

In the case where an isocyanate cross-linking agent is used as the cross-linking agent, a vinyl monomer that has a functional group and that reacts with the isocyanate cross-linking agent is preferably a hydroxyl group-containing vinyl monomer, and particularly preferably 2-hydroxyethyl (meth)acrylate, 4-hydroxybutyl (meth)acrylate, or 6-hydroxhexyl (meth)acrylate. The content of the hydroxyl group-containing vinyl monomer that reacts with the isocyanate cross-linking agent is preferably 0.01% to 1.0% by mass, and particularly preferably 0.03% to 0.3% by mass of the monomer components that constitute the acrylic copolymer.

The acrylic copolymer can be obtained by performing copolymerization using a known polymerization method such as a solution polymerization method, a bulk polymerization method, a suspension polymerization method, or an emulsion polymerization method. From the viewpoint of water resistance of the adhesive, a solution polymerization method or a bulk polymerization method is preferable. Examples of a method for initiating polymerization include an initiation method by heating using a thermal polymerization initiator such as a peroxide initiator, e.g., benzoyl peroxide or lauroyl peroxide or an azo initiator, e.g., azobisisobutyronitrile, an initiation method by irradiation with ultraviolet light using a photopolymerization initiator such as an acetophenone initiator, a benzoin ether initiator, a benzyl ketal initiator, an acyl phosphine oxide initiator, a benzoin initiator, or a benzophenone initiator, and an initiation method by irradiation with an electron beam. Any of these methods can be selected.

Regarding a molecular weight of the acrylic copolymer, a weight-average molecular weight measured by gel permeation chromatography (GPC) and determined in terms of standard polystyrene is 400,000 to 3,000,000, and preferably 800,000 to 2,500,000.

Herein, the molecular weight measured by the GPC method is a value determined on the standard polystyrene equivalent basis by using a GPC apparatus (HLC-8329GPC) manufactured by Tosoh Corporation. The measurement conditions are as follows.

Sample concentration: 0.5% by mass (THF solution)
Amount of injection of sample: 100 μL
Eluent: THF
Flow rate: 1.0 mL/min
Measurement temperature: 40° C.
Analytical column: TSKgel GMHHR-H (20), two columns
Guard column: TSKgel HXL-H
Detector: Differential refractometer
Molecular weight of standard polystyrene: 10,000 to 20,000,000 (manufactured by Tosoh Corporation)

In order to improve adhesiveness to an adherend and a surface adhesive strength, a tackifying resin is preferably used in the acrylic adhesive composition used in the present invention. Examples of the tackifying resin include rosin resins, polymerized rosin resins, polymerized rosin ester resins, rosin phenol resins, stabilized rosin ester resins, disproportionated rosin ester resins, hydrogenated rosin ester resins, terpene resins, terpene phenol resins, petroleum resins, and (meth)acrylate resins. In the case where a tackifying resin is used in an emulsion-type adhesive composition, emulsion-type tackifying resins are preferably used.

Among the above resins, disproportionated rosin ester tackifying resins, polymerized rosin ester tackifying resins, rosin phenol tackifying resins, hydrogenated rosin ester tackifying resins, and (meth)acrylate resins are preferable. These tackifying resins may be used alone or in combination of two or more resins.

The softening point of the tackifying resin is not particularly limited, but is 30° C. to 180° C. and preferably 70° C. to 140° C. By incorporating a tackifying resin having a high softening point, high adhesion performance can be expected. In the cases of (meth)acrylate tackifying resins, the glass transition temperature of the resins is 30° C. to 200° C., and preferably 50° C. to 160° C.

Regarding a blending ratio in the case where an acrylic copolymer and a tackifying resin are used, the content of the tackifying resin relative to 100 parts by mass of the acrylic copolymer is preferably 5 to 60 parts by mass, and more preferably 8 to 50 parts by mass. When the ratio of the tackifying resin to the acrylic copolymer is in the above range, adhesiveness to an adherend is easily ensured.

In order to increase a cohesive force of an adhesive layer, the adhesive is preferably cross-linked in an acrylic adhesive composition. Examples of the cross-linking agent include isocyanate cross-linking agents, epoxy cross-linking agents, metal chelate cross-linking agents, and aziridine cross-linking agents. Among these, cross-linking agents that are added after the completion of polymerization and that allow a cross-linking reaction to proceed are preferable. Isocyanate cross-linking agents and epoxy cross-linking agents, which have high reactivity with (meth)acrylic copolymers, are preferable. From the viewpoint of improving adhesiveness to a foam base, isocyanate cross-linking agents are more preferable.

Examples of the isocyanate cross-linking agents include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Trifunctional polyisocyanate compounds are particularly preferable. Examples of the trifunctional isocyanate compounds include tolylene diisocyanate and trimethylolpropane adducts thereof, and triphenylmethane isocyanate.

A gel fraction determined by measuring an insoluble matter after an adhesive layer is immersed in toluene for 24 hours is used as an index of the degree of cross-linking. The gel fraction is preferably 25% to 70% by mass. The gel fraction is more preferably 30% to 60% by mass, and still more preferably 30% to 55% by mass. When the gel fraction is in this range, both a good cohesive property and a good adhesive property are obtained.

The gel fraction is measured as follows. An adhesive composition is applied onto a release sheet so as to have a thickness of 50 μm after drying, dried at 100° C. for three minutes, and aged at 40° C. for two days. The resulting film of the adhesive composition is cut so as to have a 50 mm square shape. This film is used as a sample. Next, a weight (G1) of the sample before immersion in toluene is measured in advance. The sample is immersed in a toluene solution at 23° C. for 24 hours. A toluene-insoluble matter of the sample is then separated by filtering with a 300-mesh wire gauze, and dried at 110° C. for one hour. A weight (G2) of the resulting residue is then measured. The gel fraction is determined in accordance with a formula below:

$$\text{Gel fraction (\% by mass)} = (G2/G1) \times 100$$

Known additives such as a plasticizer; a softening agent; an antioxidant; a flame retardant; a filler such as a fiber, balloon, or bead composed of glass or a plastic, a metal powder, a metal oxide, or a metal nitride; a colorant such as a pigment or a dye; a leveling agent; a viscosity improver; a water repellent; and an antifoaming agent may be optionally added, as additives of an adhesive, to the adhesive composition.

Regarding the adhesive layer used in the adhesive tape of the present invention, a temperature at which a loss tangent (tan δ) at a frequency of 1 Hz becomes a peak value is preferably −40° C. to 15° C. When the peak value of the loss tangent of the adhesive layer is in the above range, good adhesiveness to an adherend at room temperature is easily provided. In particular, in order to improve drop impact resistance in a low-temperature environment, the temperature is more preferably −35° C. to 10° C., and still more preferably −30° C. to 6° C.

The loss tangent (tan δ) at a frequency of 1 Hz is determined by a formula tan δ=G″/G′ from a storage modulus (G') and a loss modulus (G") determined by a temperature dispersion measurement of dynamic viscoelasticity. The dynamic viscoelasticity is measured by using a viscoelasticity tester (manufactured by TA Instruments Japan Inc., trade name: ARES G2). A test piece of an adhesive layer formed so as to have a thickness of about 2 mm is interposed between parallel discs having a diameter of 8 mm and used as a measurement unit of the tester. The storage modulus (G') and the loss modulus (G") are measured from −50° C. to 150° C. at a frequency of 1 Hz.

The thickness of the adhesive layer used in the present invention is preferably 10 to 100 µm, and more preferably 20 to 80 µm because adhesiveness to an adherend, rework suitability, and removability are easily obtained even in the case where the adhesive layer is used in an adhesive tape having a small thickness.

[Adhesive Tape]

An adhesive tape of the present invention includes the foam base described above and an adhesive layer disposed on at least one surface, preferably both surfaces of the foam base. Accordingly, the foam of the adhesive tape can absorb an impact at the time of dropping, and the adhesive tape has excellent impact resistance as a result of a significant improvement in the strength to interlaminar fracture. Thus, even when a panel of a large screen is fixed by using the adhesive tape or even when a panel is fixed by using the adhesive tape having a small width, detachment and cracking of the adhesive tape do not easily occur at the time of dropping. The adhesive tape of the present invention can be suitably used in portable electronic devices such as smartphones and tablet personal computers whose screen size has been increasing and for which a requirement for flexible design is high. Accordingly, waterproofness, a drip-proof property, and dust resistance can be effectively provided even to portable electronic devices whose thicknesses have been decreasing, in which the space in a housing is strictly limited, and for which it is difficult to provide separate sealing means. Furthermore, since the foam base and the adhesive layer are used, the adhesive tape can exhibit good adhesiveness to an adherend, effectively prevent water and dust from entering from a gap in a close contact portion, and thus has excellent waterproofness, an excellent drip-proof property, and excellent dust resistance.

The adhesive tape according to an embodiment of the present invention has a basic structure in which an adhesive layer is provided on at least one surface, preferably both surfaces of a foam base serving as a central core. The base and the adhesive layer may be stacked either directly or with another layer therebetween. The form of the adhesive tape may be appropriately selected in accordance with the use. In the case where dimensional stability or a tensile strength is further provided to the tape, a laminate layer such as a polyester film may be provided. In the case where a light-shielding property is provided to the tape, a light-shielding layer may be provided. In the case a light-reflecting property is ensured, a light-reflecting layer may be provided. In the cases where any of these other layers is provided, a waterproof layer is used as the other layer.

Examples of the laminate layer include resin films such as polyester films composed of polyethylene terephthalate or the like, polyethylene films, and polypropylene films. From the viewpoint of followability of the foam base, the thicknesses of these films are preferably 1 to 16 µm and more preferably 2 to 12 µm.

An example of the light-shielding layer that can be easily used is a layer formed by using an ink containing a colorant such as a pigment. A layer composed of a black ink is preferably used because such a layer has an excellent light-shielding property. An example of the light-reflecting layer that can be easily used is a layer formed by using a white ink. The thicknesses of these layers are preferably 2 to 20 µm, and more preferably 4 to 6 µm. When the thicknesses are in the above range, curling of the base due to the cure shrinkage of the ink does not easily occur, and thus good processability of the tape is obtained.

The adhesive tape of the present invention can be produced by a publicly known and commonly used method. Examples of the method include a direct application method including applying an adhesive composition onto a foam base directly or onto a surface of another layer stacked on a foam base, and drying the adhesive composition, and a transfer method including applying an adhesive composition onto a release sheet, drying the adhesive composition, and then bonding the release sheet to a foam base or a surface of another layer. In the case where the adhesive layer is prepared by drying a mixture of an acrylic adhesive composition and a cross-linking agent, after the preparation of an adhesive tape, aging is preferably performed in an environment at 20° C. to 50° C., preferably 23° C. to 45° C. for two to seven days because adhesiveness between the foam base and the adhesive layer and adhesive properties are stabilized.

The thickness of the adhesive tape of the present invention may be appropriately adjusted in accordance with the form used, but is 70 to 1,400 µm. In the case where the adhesive tape is used for fixing a component of an electronic device, in particular, a compact portable electronic device having a small thickness, a small tape thickness is required. Therefore, the thickness of the adhesive tape of the present invention is preferably 100 to 700 µm, and particularly preferably 120 to 600 µm. When the tape thickness is in the above thickness range, the adhesive tape can also be suitably used in compact portable electronic devices having small thicknesses, and good waterproofness can be realized.

The double-sided adhesive tape of the present invention has a surface adhesive strength of preferably 100 N/4 $cm^2$ or more, and more preferably 130 N/4 $cm^2$ or more, the surface adhesive strength being measured under measurement conditions described below.

The measurement conditions of the surface adhesive strength are as follows.

1) Two strips of a double-sided adhesive tape having a width of 5 mm and a length of 4 cm are attached at 23° C. to an acrylic board that is 2 mm thickness and 5 cm square so as to be parallel to each other.

2) Next, the acrylic board with the double-sided adhesive tape strips prepared in 1) is attached to a smooth ABS board which has a thickness of 2 mm and a rectangular shape of 10×15 cm and in which a hole having a diameter of 1 cm is formed in a central portion thereof such that the center of the acrylic board coincides with the center of the ABS board. A pressure is applied thereto by using a 2 kg-roller so as to reciprocate once. The resulting boards are then allowed to stand at 23° C. for one hour. Thus, a test piece is prepared.

3) The acrylic board is pressed at a rate of 10 mm/min from the ABS side of the test piece through the hole of the ABS board by using a tensile testing machine provided with a stainless probe having a diameter of 8 mm. A strength at which the acrylic board is detached is measured.

Examples of the release sheet used in the present invention include, but are not particularly limited to, bases such as synthetic resin films, e.g., a polyethylene, polypropylene, and polyester films, paper, non-woven fabrics, cloths, foamed sheets, metal foils, and laminates thereof, at least one surface of which has been subjected to a release treatment for enhancing a property of separating from an adhesive, such as a silicone treatment, a long-chain alkyl treatment, or a fluorine treatment.

Among these, preferable are woodfree paper, both surfaces of which are laminated with polyethylene having a thickness of 10 to 40 µm, and a release sheet prepared by performing a silicone release treatment on one surface or both surfaces of a base formed of a polyester film.

The adhesive tape of the present invention has good followability to an adherend. Therefore, the adhesive tape can effectively prevent water and dust from entering from a gap in a close contact portion, and thus has excellent waterproofness, an excellent drip-proof property, and excellent dust resistance. Accordingly, waterproofness, a drip-proof property, and dust resistance can be effectively provided even to portable electronic devices whose thicknesses have been decreasing, in which the space in a housing is strictly limited, and for which it is difficult to provide separate sealing means. In the fixation of an information display unit having a large screen size or a panel that protects such an information display unit, and in the fixation of a protective panel or an information display device module with an adhesive tape having a small width, a good adhesive property and good followability to an adherend, and excellent impact resistance can be realized.

The adhesive tape of the present invention has the excellent properties described above, and thus can be suitably used in portable electronic devices such as electronic notebooks, cellular phones, PHS, digital cameras, music players, televisions, notebook personal computers, smartphones, tablet personal computers, and game machines. In particular, the adhesive tape of the present invention can be suitably used for bonding between a housing and a panel that protects an information display device such as an LED or an OELD, bonding between housings, bonding between a housing and an information input device such as a touch panel or a sheet-like ten keypad, and bonding between a housing and an information display device such as an LED or OELD having a diagonal length of 3.5 to 16 inches. Furthermore, the adhesive tape of the present invention can be suitably used for, for example, fixing built-in batteries, speakers, receivers, piezoelectric elements, printed circuit boards, flexible printed circuit boards (FPC), digital camera modules, sensors, other modules, cushion rubber member composed of polyurethane, polyolefin, or the like, decorating components, and various members. In particular, even in portable electronic terminals which have a diagonal length of 3.5 to 16 inches, preferably 3.5 to 12.1 inches, whose screen sizes of information display units have been increasing, and which receive large shocks at the time of falling, excellent impact resistance can be realized even when the portable electronic devices fall from a desk or are dropped during operation while a user is walking. Therefore, the adhesive tape of the present invention can be particularly suitably used for fixing components of such portable electronic terminals having large screens.

EXAMPLES

Preparation of Adhesive Composition (A)

In a reaction vessel equipped with a stirrer, a reflux condenser, a thermometer, a dropping funnel, and a nitrogen gas inlet, 93.4 parts by mass of n-butyl acrylate, 3.5 parts by mass of acrylic acid, 3 parts by mass of vinyl acetate, 0.1 parts by mass of 2-hydroxyethyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (1) having a weight-average molecular weight of 1,600,000 (in terms of polystyrene) was obtained. Next, 9.4 parts by mass of "Super Ester A100" (glycerin ester of disproportionated rosin) manufactured by Arakawa Chemical Industries, Ltd. and 9.4 parts by mass of "HARITACK PCJ" (pentaerythritol ester of polymerized rosin) manufactured by Harima Chemicals, Inc. were added to 100 parts by mass of the acrylic copolymer (1). Ethyl acetate was added to the mixture, and the resulting mixture was uniformly mixed. Thus, an adhesive composition (A) having a content of non-volatile matter of 38% was prepared.

Preparation of Adhesive Composition (B)

In a reaction vessel equipped with a stirrer, a reflux condenser, a thermometer, a dropping funnel, and a nitrogen gas inlet, 97.97 parts by mass of n-butyl acrylate, 2.0 parts by mass of acrylic acid, 0.03 parts by mass of 4-hydroxybutyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (2) having a weight-average molecular weight of 2,000,000 (in terms of polystyrene) was obtained. Next, 25 parts by mass of "Super Ester A100" (glycerin ester of disproportionated rosin) manufactured by Arakawa Chemical Industries, Ltd., 5 parts by mass of "PENSEL D135" (pentaerythritol ester of polymerized rosin) manufactured by Arakawa Chemical Industries, Ltd., and 20 parts by mass of FTR6100 (styrene-based petroleum resin) manufactured by Mitsui Chemicals Inc. were added to 100 parts by mass of the acrylic copolymer (2). Ethyl acetate was added to the mixture, and the resulting mixture was uniformly mixed. Thus, an adhesive composition (B) having a content of non-volatile matter of 40% was prepared.

Preparation of Adhesive Composition (C)

In a reaction vessel equipped with a stirrer, a reflux condenser, a thermometer, a dropping funnel, and a nitrogen gas inlet, 44.94 parts by mass of n-butyl acrylate, 50 parts by mass of 2-ethylhexyl acrylate, 3 parts by mass of vinyl acetate, 2 parts by mass of acrylic acid, 0.06 parts by mass of 4-hydroxybutyl acrylate, and 0.1 parts by mass of 2,2'-azobisisobutyronitrile serving as a polymerization initiator were dissolved in 100 parts by mass of ethyl acetate serving as a solvent, and polymerization was conducted at 70° C. for 12 hours. Thus, an acrylic copolymer (3) having a weight-average molecular weight of 1,200,000 (in terms of polystyrene) was obtained. Next, 10 parts by mass of "PENSEL D135" (pentaerythritol ester of polymerized rosin) manufactured by Arakawa Chemical Industries, Ltd. was added to 100 parts by mass of the acrylic copolymer (3). Ethyl acetate was added to the mixture, and the resulting mixture was uniformly mixed. Thus, an adhesive composition (C) having a content of non-volatile matter of 45% was prepared.

Example 1

Preparation of Double-Sided Adhesive Tape

First, 1.1 parts by mass of "Coronate L-45" (isocyanate cross-linking agent, solid content: 45%) manufactured by Nippon Polyurethane Industry Co., Ltd. was added relative to 100 parts by mass of the adhesive composition (A), and the resulting mixture was stirred for 15 minutes. The mixture was then applied onto a release treatment surface of a PET film having a thickness of 75 μm, the PET film having been subjected to a release treatment, such that the thickness after drying became 50 μm. The PET film was dried at 80° C. for three minutes to form an adhesive layer. The adhesive layer had a gel fraction of 48% by mass and a temperature at which a loss tangent (tan δ) at a frequency of 1 Hz became a peak value of −16° C.

Next, the adhesive layer was bonded to each surface of a base formed of a black polyolefin foam (1) (thickness: 200 μm, apparent density: 0.39 g/cm$^3$, 25% compressive strength: 450 kPa, modulus of elasticity in tension in machine direction: 964 N/cm$^2$, modulus of elasticity in tension in cross-machine direction: 666 N/cm$^2$, interlaminar strength: 42.4 N/cm, the wetting index of the surfaces was adjusted to 52 mN/m by a corona treatment). The base was then laminated with the adhesive layers at 23° C. with a roll at a line pressure of 5 kg/cm. Subsequently, aging was performed at 40° C. for 48 hours. Thus, a double-sided adhesive tape having a thickness of 300 μm was obtained.

Example 2

A double-sided adhesive tape having a thickness of 250 μm was obtained by the same method as in Example 1 except that the thickness of the adhesive composition (A) after drying was 25 μm.

Example 3

A double-sided adhesive tape having a thickness of 300 μm was obtained by the same method as in Example 1 except that the adhesive composition (B) was used instead of the adhesive composition (A), and 1.33 parts by mass of "Coronate L-45" (isocyanate cross-linking agent, solid content: 45%) manufactured by Nippon Polyurethane Industry Co., Ltd. was added relative to 100 parts by mass of the adhesive composition B. The adhesive layer had a gel fraction of 37% by mass and a temperature at which a loss tangent (tan δ) at a frequency of 1 Hz became a peak value of 2° C.

Example 4

A double-sided adhesive tape having a thickness of 300 μm was obtained by the same method as in Example 1 except that 0.93 parts by mass of "Coronate L-45" (isocyanate cross-linking agent, solid content: 45%) manufactured by Nippon Polyurethane Industry Co., Ltd. was added relative to 100 parts by mass of the adhesive composition (C) instead of the adhesive composition (A). The adhesive layer had a gel fraction of 42% by mass and a temperature at which a loss tangent (tan δ) at a frequency of 1 Hz became a peak value of −28° C.

Example 5

A double-sided adhesive tape having a thickness of 300 μm was obtained by the same method as in Example 1 except that a black polyolefin foam (2) (thickness: 200 μm, apparent density: 0.36 g/cm$^3$, 25% compressive strength: 388 kPa, modulus of elasticity in tension in machine direction: 883 N/cm$^2$, modulus of elasticity in tension in cross-machine direction: 624 N/cm$^2$, interlaminar strength: 28.4 N/cm, the wetting index of the surfaces was adjusted to 52 mN/m by a corona treatment) was used instead of the black polyolefin foam (1).

Example 6

A double-sided adhesive tape having a thickness of 300 μm was obtained by the same method as in Example 1 except that the black polyolefin foam (1) was changed to a black polyolefin foam (3) (thickness: 200 μm, apparent density: 0.45 g/cm$^3$, 25% compressive strength: 332 kPa, modulus of elasticity in tension in machine direction: 1,072 N/cm$^2$, modulus of elasticity in tension in cross-machine direction: 675 N/cm$^2$, interlaminar strength: 27.4 N/cm, the wetting index of the surfaces was adjusted to 52 mN/m by a corona treatment).

Example 7

A double-sided adhesive tape having a thickness of 250 μm was obtained by the same method as in Example 3 except that the black polyolefin foam (1) was changed to a black polyolefin foam (4) (thickness: 150 μm, apparent density: 0.40 g/cm$^3$, 25% compressive strength: 207 kPa, modulus of elasticity in tension in machine direction: 1,022 N/cm$^2$, modulus of elasticity in tension in cross-machine direction: 734 N/cm$^2$, interlaminar strength: 27.0 N/cm, the wetting index of the surfaces was adjusted to 52 mN/m by a corona treatment).

Example 8

A double-sided adhesive tape having a thickness of 330 μm was obtained by the same method as in Example 3 except that the black polyolefin foam (1) was changed to a black polyolefin foam (5) (thickness: 230 μm, apparent density: 0.35 g/cm$^3$, 25% compressive strength: 301 kPa, modulus of elasticity in tension in machine direction: 933 N/cm$^2$, modulus of elasticity in tension in cross-machine direction: 593 N/cm$^2$, interlaminar strength: 29.4 N/cm, the wetting index of the surfaces was adjusted to 52 mN/m by a corona treatment).

Example 9

A double-sided adhesive tape having a thickness of 600 μm was obtained by the same method as in Example 1 except that the black polyolefin foam (1) was changed to a black polyolefin foam (6) (thickness: 500 μm, apparent density: 0.14 g/cm$^3$, 25% compressive strength: 98 kPa, modulus of elasticity in tension in machine direction: 411 N/cm$^2$, modulus of elasticity in tension in cross-machine direction: 245 N/cm$^2$, interlaminar strength: 30.0 N/cm, the wetting index of the surfaces was adjusted to 52 mN/m by a corona treatment).

Comparative Example 1

First, 1.1 parts by mass of "Coronate L-45" (isocyanate cross-linking agent, solid content: 45%) manufactured by Nippon Polyurethane Industry Co., Ltd. was added relative to 100 parts by mass of the adhesive composition (A), and the resulting mixture was stirred for 15 minutes. The mixture was then applied onto a release treatment surface of a PET film having a thickness of 75 μm, the PET film having been subjected to a release treatment, such that the thickness after drying became 80 µm. The PET film was dried at 80° C. for three minutes to form an adhesive layer.

Next, the adhesive layer was bonded to each surface of a black polyolefin foam (7) (thickness: 140 µm, apparent density: 0.40 g/cm$^3$, 25% compressive strength: 130 kPa, modulus of elasticity in tension in machine direction: 994 N/cm$^2$, modulus of elasticity in tension in cross-machine direction: 713 N/cm$^2$, interlaminar strength: 19.1 N/cm, the wetting index of the surfaces was adjusted to 52 mN/m by a corona treatment) instead of the black polyolefin foam (1). The black polyolefin foam (7) was then laminated with the adhesive layers at 23° C. with a roll at a line pressure of 5 kg/cm. Subsequently, aging was performed at 40° C. for 48 hours. Thus, a double-sided adhesive tape having a thickness of 300 µm was obtained.

Comparative Example 2

A double-sided adhesive tape having a thickness of 300 µm was obtained by the same method as in Example 1 except that a black polyolefin foam (8) (thickness: 200 µm, apparent density: 0.20 g/cm$^3$, 25% compressive strength: 52 kPa, modulus of elasticity in tension in machine direction: 495 N/cm$^2$, modulus of elasticity in tension in cross-machine direction: 412 N/cm$^2$, interlaminar strength: 12.9 N/cm, the wetting index of the surfaces was adjusted to 52 mN/m by a corona treatment) was used instead of the black polyolefin foam (1).

Comparative Example 3

First, 1.1 parts by mass of "Coronate L-45" (isocyanate cross-linking agent, solid content: 45%) manufactured by Nippon Polyurethane Industry Co., Ltd. was added relative to 100 parts by mass of the adhesive composition (A), and the resulting mixture was stirred for 15 minutes. The mixture was then applied onto a release treatment surface of a PET film having a thickness of 75 µm, the PET film having been subjected to a release treatment, such that the thickness after drying became 15 µm. The PET film was dried at 80° C. for three minutes to form an adhesive layer.

Next, the adhesive layer was bonded to each surface of a black polyolefin foam (9) (thickness: 80 µm, apparent density: 0.39 g/cm$^3$, 25% compressive strength: 92 kPa, modulus of elasticity in tension in machine direction: 1,062 N/cm$^2$, modulus of elasticity in tension in cross-machine direction: 962 N/cm$^2$, interlaminar strength: 10.2 N/cm, the wetting index of the surfaces was adjusted to 52 mN/m by a corona treatment) instead of the black polyolefin foam (1). The black polyolefin foam (9) was then laminated with the adhesive layers at 23° C. with a roll at a line pressure of 5 kg/cm. Subsequently, aging was performed at 40° C. for 48 hours. Thus, a double-sided adhesive tape having a thickness of 110 µm was obtained.

Comparative Example 4

A double-sided adhesive tape having a thickness of 200 µm was obtained by the same method as in Example 1 except that a black polyolefin foam (10) (thickness: 100 µm, apparent density: 0.33 g/cm$^3$, 25% compressive strength: 70 kPa, modulus of elasticity in tension in machine direction: 799 N/cm$^2$, modulus of elasticity in tension in cross-machine direction: 627 N/cm$^2$, interlaminar strength: 8.9 N/cm, the wetting index of the surfaces was adjusted to 52 mN/m by a corona treatment) was used instead of the black polyolefin foam 1.

Comparative Example 5

A double-sided adhesive tape having a thickness of 200 µm was obtained by the same method as in Example 1 except that a black polyolefin foam (11) (thickness: 100 µm, apparent density: 0.36 g/cm$^3$, 25% compressive strength: 103 kPa, modulus of elasticity in tension in machine direction: 1,084 N/cm$^2$, modulus of elasticity in tension in cross-machine direction: 790 N/cm$^2$, interlaminar strength: 12.6 N/cm, the wetting index of the surfaces was adjusted to 52 mN/m by a corona treatment) was used instead of the black polyolefin foam (1).

Comparative Example 6

A double-sided adhesive tape having a thickness of 200 µm was obtained by the same method as in Example 1 except that a black polyolefin foam (12) (thickness: 100 µm, apparent density: 0.41 g/cm$^3$, 25% compressive strength: 190 kPa, modulus of elasticity in tension in machine direction: 964 N/cm$^2$, modulus of elasticity in tension in cross-machine direction: 861 N/cm$^2$, interlaminar strength: 16.2 N/cm, the wetting index of the surfaces was adjusted to 52 mN/m by a corona treatment) was used instead of the black polyolefin foam (1).

Comparative Example 7

A double-sided adhesive tape having a thickness of 200 µm was obtained by the same method as in Example 1 except that a black polyolefin foam (13) (thickness: 100 µm, apparent density: 0.46 g/cm$^3$, 25% compressive strength: 270 kPa, modulus of elasticity in tension in machine direction: 1,456 N/cm$^2$, modulus of elasticity in tension in cross-machine direction: 956 N/cm$^2$, interlaminar strength: 13.6 N/cm, the wetting index of the surfaces was adjusted to 52 mN/m by a corona treatment) was used instead of the black polyolefin foam (1).

Comparative Example 8

A double-sided adhesive tape having a thickness of 300 µm was obtained by the same method as in Comparative Example 1 except that the adhesive composition (B) was used instead of the adhesive composition (A), and 1.33 parts by mass of "Coronate L-45" (isocyanate cross-linking agent, solid content: 45%) manufactured by Nippon Polyurethane Industry Co., Ltd. was added relative to 100 parts by mass of the adhesive composition (B).

Comparative Example 9

A double-sided adhesive tape having a thickness of 200 µm was obtained by the same method as in Example 4 except that a non-woven fabric (basis weight: 17 g/m$^2$, tensile strength: 16.0 N/cm) was used instead of the black polyolefin foam (1) and an adhesive layer composed of the adhesive composition (C) and having a thickness of 80 µm after drying was used.

Comparative Example 10

A double-sided adhesive tape having a thickness of 200 µm was obtained by the same method as in Example 1 except that a polyethylene terephthalate (PET) film (thickness: 25 µm, the wetting index of the surfaces was adjusted to 52 mN/m by a corona treatment) was used instead of the black polyolefin foam (1) and an adhesive layer composed of the adhesive and having a thickness of 88 μm after drying was used.

For the foam bases used in Examples and Comparative Examples and the double-sided adhesive tapes obtained in Examples and Comparative Examples, the following evaluations were performed. The results are shown in Tables 1 and 2.

[Thicknesses of Foam Base and Adhesive Tape]

The thicknesses of the foam bases and the adhesive tapes were measured with a dial thickness gauge Model G manufactured by OZAKI MFG. Co., Ltd. Regarding the adhesive tapes, the thicknesses were measured after the release films were removed.

[Interlaminar Strength of Foam Base]

First, 1.33 parts by mass of "Coronate L-45" (isocyanate cross-linking agent, solid content: 45%) manufactured by Nippon Polyurethane Industry Co., Ltd. was added relative to 100 parts by mass of the adhesive composition (B), and the resulting mixture was stirred for 15 minutes. The mixture was then applied onto a PET film having a thickness of 75 μm, the PET film having been subjected to a release treatment, such that the thickness after drying became 50 μm. The PET film was dried at 80° C. for three minutes to form an adhesive layer. Next, the adhesive layer was bonded to each surface of a foam whose interlaminar strength is to be evaluated. The foam was then laminated with the adhesive layers at 23° C. with a roll at a line pressure of 5 kgf/cm. Subsequently, aging was performed at 40° C. for 48 hours. Thus, a double-sided adhesive tape for the measurement of an interlaminar strength was obtained.

Next, one adhesive surface of the double-sided adhesive tape was lined with a polyethylene terephthalate film (whose surface to be bonded to the one adhesive surface was subjected to a corona treatment so as to have a wetting index of 52 mN/m) which had a thickness of 25 μm, thus preparing a double-sided adhesive tape sample having a width of 1 cm and a length of 10 cm (in the machine direction of the foam base). The double-sided adhesive tape sample was attached to a polyethylene terephthalate film (whose surface to be bonded to an adhesive surface was subjected to a corona treatment so as to have a wetting index of 52 mN/m) which had a thickness of 50 μm at 23° C. and at 50% RH under pressure by using a 2-kg roller so as to reciprocate once, and was allowed to stand at 60° C. for 48 hours. After the sample was allowed to stand at 23° C. for 24 hours, the sample was fixed to a test piece stage of a high-speed peel testing machine (TE-703, manufactured by Tester Sangyo Co., Ltd.) using a double-sided adhesive tape for fixing such that a surface of the polyethylene terephthalate film having a thickness of 50 μm was disposed on the test piece stage. The polyethylene terephthalate film having a thickness of 25 μm was then pulled at 23° C. in a direction of 90 degrees at a tensile speed of 15 m/min to tear the foam (i.e., break the base). The maximum strength at this time was measured. Unit: N/cm

[Modulus of Elasticity in Tension]

A foam base or a double-sided adhesive tape (from which a release film had been removed) was processed into a test piece having a distance between reference lines of 2 cm (in the machine direction and the cross-machine direction of the foam base) and a width of 1 cm. The foam base or the double-sided adhesive tape was pulled at a tensile speed of 300 mm/min. In this case, the strength at the time when the foam base or the double-sided adhesive tape was broken was measured.

[Tensile Elongation]

A foam base or a double-sided adhesive tape (from which a release film had been removed) was processed into a test piece having a distance between reference lines of 2 cm in the machine direction of the foam base and a width of 1 cm. The foam base or the double-sided adhesive tape was pulled at a tensile speed of 300 mm/min. In this case, the elongation at the time when the foam base or the double-sided adhesive tape was broken was defined as a tensile elongation.

[Average Bubble Diameters of Foam Base in Machine Direction and Cross-Machine Direction]

A foam base was cut so as to have a dimension in the machine direction of about 1 cm and a dimension in the cross-machine direction of about 1 cm. A central portion of a cross section of the cut foam base was enlarged at a magnification of 200 by using a microscope (trade name "KH-7700", manufactured by HiROX Co., Ltd.). Subsequently, a photograph of a cross section in the cross-machine direction or the machine direction of the foam base was taken such that the photograph included the cross section of the foam base over the entire length of the cross section in the vertical direction of the base. In the obtained photograph, the diameters of all bubbles that were present on a cross section corresponding to an actual length of 2 mm before the magnification in the cross-machine direction or the machine direction were measured. An average bubble diameter was calculated from the average of the diameters. This measurement was conducted at 10 arbitrary positions. The average of the diameters at the 10 positions was defined as an average bubble diameter in the machine direction (MD) or an average bubble diameter in the cross-machine direction (CD).

[Average Bubble Diameter of Foam Base in Vertical Direction]

An average bubble diameter of a foam base in the vertical direction was determined as follows. Observation with a microscope was conducted under the same conditions as those of the measurement of the average bubble diameter of a foam base in the machine direction. For bubbles whose diameters in the machine direction or the cross-machine direction were measured in an obtained photograph, the diameters of all the bubbles in the vertical direction were measured. The average bubble diameter was calculated from the average of the diameters. This measurement was conducted at 10 arbitrary positions. The average of the diameters at the 10 positions was defined as the average bubble diameter in the vertical direction (VD). Furthermore, ratios of average bubble diameters were determined on the basis of the average bubble diameter in the vertical direction (VD) and the average bubble diameters in the machine direction (MD) and in the cross-machine direction (CD) determined above.

[Surface Adhesive Strength]

1) Two strips of the above-prepared double-sided adhesive tape having a width of 5 mm and a length of 40 mm were attached at 23° C. to an acrylic board (ACRYLITE MR200 "Trade name", manufactured by Mitsubishi Rayon Co., Ltd., Color: transparent) that was 2 mm thickness and 50 mm square so as to be parallel to each other with a distance of 40 mm therebetween (FIG. 1).

Figure 2:
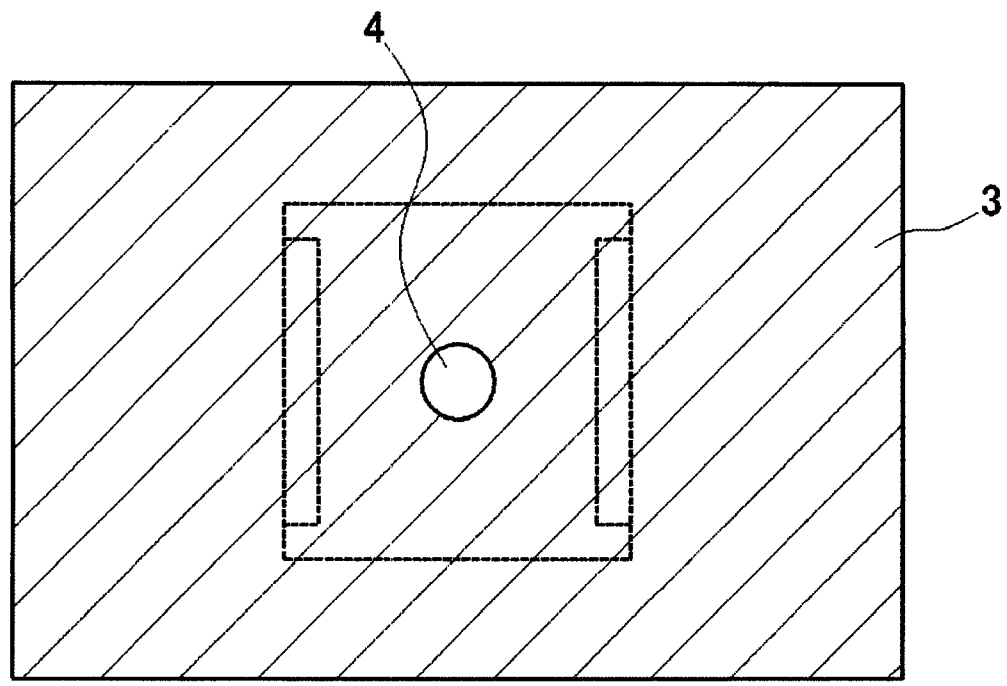
FIG. 2 is a schematic view illustrating a test piece for a surface adhesive strength, the test piece being prepared by bonding an acrylic board to an acrylonitrile-butadiene-styrene (ABS) board with double-sided adhesive tapes 1 such that the acrylic board coincides with the center of a hole of the ABS board.

2) Next, the acrylic board with the double-sided adhesive tape strips prepared in 1) was attached to an ABS board (Tafuesu (SUNLOID ABS) R EAR003, manufactured by Sumitomo Bakelite Co., Ltd, Color: natural, without embossing) which had a thickness of 2 mm and a rectangular shape of 100×150 mm and in which a hole having a diameter of 10 mm was formed in a central portion thereof such that the center of the acrylic board coincided with the center of the ABS board. A pressure was applied thereto by using a 2 kg-roller so as to reciprocate once. The resulting boards were then allowed to stand at 23° C. for one hour. Thus a test piece was prepared (FIG. 2).

Figure 3:
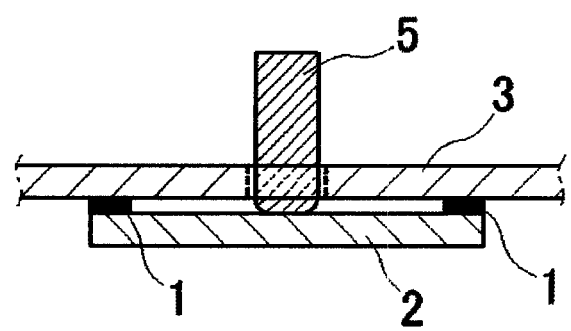
FIG. 3 is a schematic view illustrating a method for measuring a surface adhesive strength.

3) The acrylic board was pressed at a rate of 10 mm/min from the ABS side of the test piece through the hole of the ABS board by using a tensile testing machine provided with a stainless probe having a diameter of 8 mm. A strength at which the acrylic board was detached was measured (FIG. 3).

[Drop Impact Test]

Figure 4:
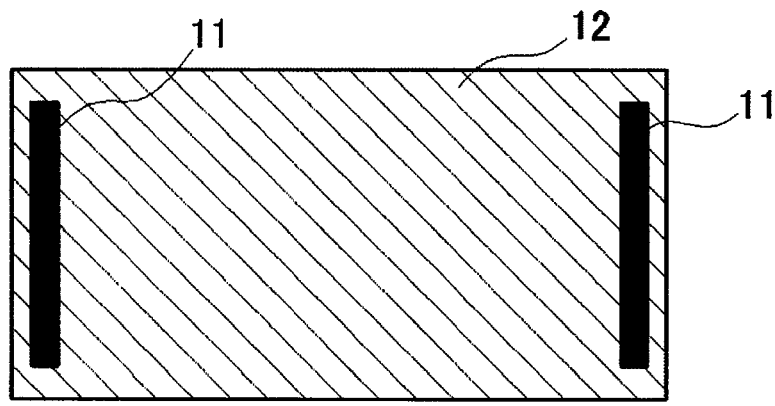
FIG. 4 is a schematic view of a test piece for a drop impact test, the test piece being viewed from a top surface.
Figure 5:
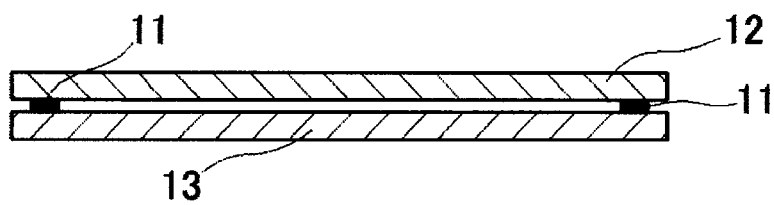
FIG. 5 is a schematic view of a test piece for a drop impact test, the test piece being viewed from a cross-sectional direction.

1) Two strips of the above-prepared double-sided adhesive tape having a width of 2 mm and a length of 20 mm were attached to an acrylic board having a thickness of 2 mm, a width of 25 mm, and a length of 50 mm so as to be parallel to each other with a distance of 45 mm therebetween in the cross-machine direction (FIG. 4). The acrylic board was then attached to another acrylic board having a thickness of 2 mm, a width of 25 mm, and a length of 50 mm. A pressure was applied thereto by using a 2 kg-roller so as to reciprocate once. The resulting acrylic boards were then allowed to stand at 23° C. for 24 hours. Thus, a test piece was prepared (FIG. 5).

Figure 6:
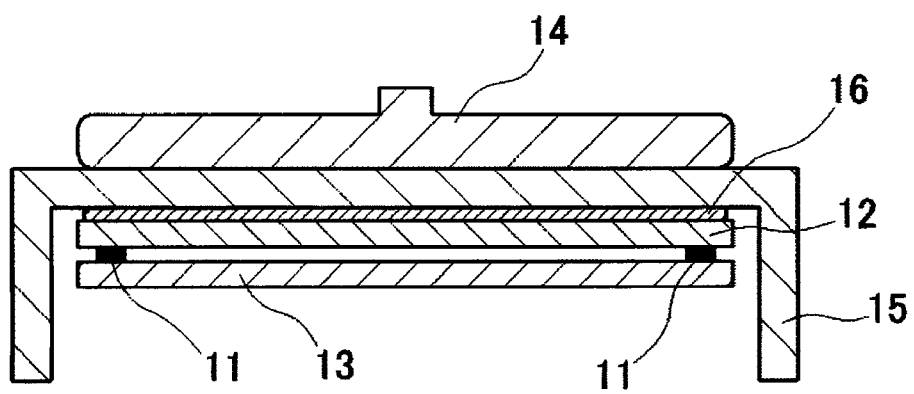
FIG. 6 is a schematic view of a state in which a test piece for a drop impact test is attached to a drop test jig, the state being viewed from a cross-sectional direction.

2) The test piece was fixed to a stainless dropping measuring jig including a metal weight (total mass: 300 g) with a double-sided adhesive tape for fixing, the adhesive tape having a width of 25 mm and a length of 50 mm (FIG. 6). The test piece was repeatedly dropped initially from a height of 10 cm and then in increments of 10 cm (5 times at each height) to a concrete surface. The height at which detachment or breaking of the tape was observed in the test piece was measured.

A: Even after the test from a height of 90 cm was performed, detachment and breaking of the tape did not occur.

B: Even after the test from a height of 70 cm was performed, detachment and breaking of the tape did not occur.

C: When the test from a height of 60 to 70 cm was performed, detachment and breaking of the tape occurred.

D: When the test from a height of 50 cm or less was performed, detachment and breaking of the tape occurred.

[Followability Test]

Figure 7:
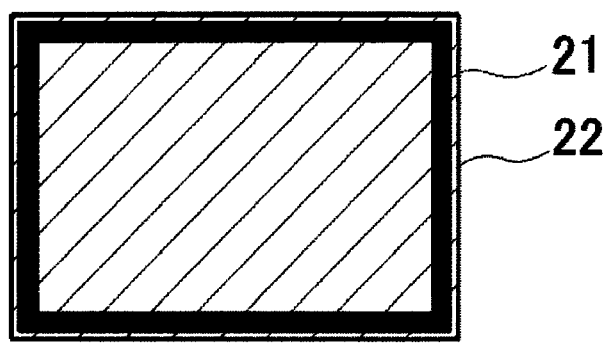
FIG. 7 is a schematic view illustrating an acrylic board having a double-sided adhesive tape and used for a followability/waterproof test.

1) A frame-shaped sample having outer dimensions of 64 mm×43 mm and a width of 2 mm was prepared by using the double-sided adhesive tape obtained above, and attached to an acrylic board having a thickness of 2 mm and outer dimensions of 65 mm×45 mm (FIG. 7).

Figure 8:
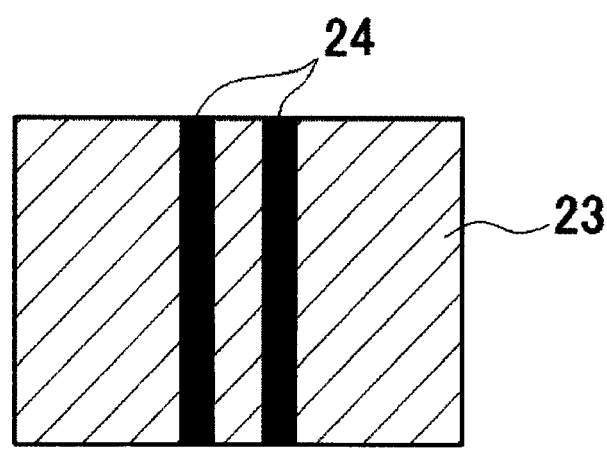
FIG. 8 is a schematic view illustrating an acrylic board having steps and used for a followability/waterproof test.

2) Next, two strips of a single-sided adhesive tape (for forming a step) including a polyethylene terephthalate base and having a thickness of 30 μm, a width of 5 mm, and a length of 45 mm were attached to central portions of another acrylic board having a thickness of 2 mm and outer dimensions of 65 mm×45 mm so as to be parallel to each other with a distance of 1 cm therebetween in a lengthwise direction. Thus, an acrylic board having steps was prepared (FIG. 8).

Figure 9:
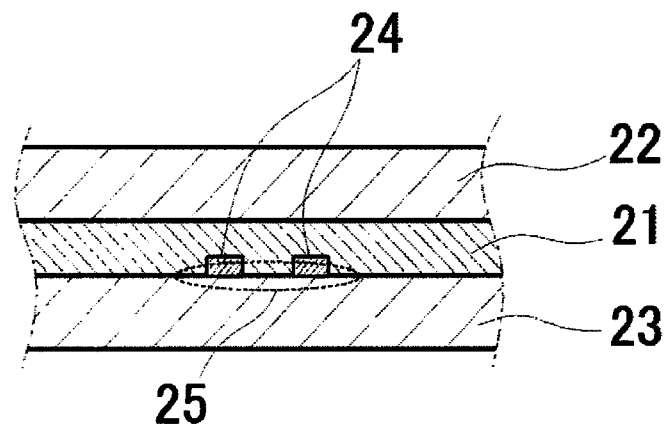
FIG. 9 is a schematic view of a state in which an acrylic board having a double-sided adhesive tape and an acrylic board having steps, the acrylic boards being used for a followability/waterproof test, are bonded to each other, the state being viewed from a cross-sectional direction.

3) The acrylic board with the double-sided adhesive tape strips was placed at 23° C. on the adhesive tape portions of the acrylic board having the steps. A pressure was then applied thereto from an end by using a 2 kg-roller so as to reciprocate once (FIG. 9).

4) The following state of the double-sided adhesive tape near the steps was evaluated by visual observation from the acrylic board side, the acrylic board having the steps.

B: The double-sided adhesive tape was in close contact with the acrylic board having the steps.

C: The double-sided adhesive tape was not in close contact with the acrylic board having the steps.

[Waterproof Test]

1) A frame-shaped sample having outer dimensions of 64 mm×43 mm and a width of 2 mm was prepared by using the double-sided adhesive tape obtained above, and attached to an acrylic board having a thickness of 2 mm and outer dimensions of 65 mm×45 mm (FIG. 7).

2) Next, two strips of a single-sided adhesive tape (for forming a step) including a polyethylene terephthalate base and having a thickness of 30 μm, a width of 5 mm, and a length of 45 mm were attached to central portions of another acrylic board having a thickness of 2 mm and outer dimensions of 65 mm×45 mm so as to be parallel to each other with a distance of 1 cm therebetween in a lengthwise direction. Thus, an acrylic board having steps was prepared (FIG. 8).

3) The double-sided adhesive tape side of the acrylic board with the double-sided adhesive tape strips was placed at 23° C. on the adhesive tape portions of the acrylic board having the steps. A pressure was then applied thereto from an end by using a 2 kg-roller so as to reciprocate once. The resulting acrylic plates were allowed to stand at 23° C. for 24 hours. Thus, a test piece was prepared (FIG. 9).

4) The test piece was allowed to stand in water at a depth of 1 m for 30 minutes (in accordance with IPX7 of JIS C0920). Subsequently, occurrence or non-occurrence of entering of water in the frame of the frame-shaped double-sided adhesive tape was evaluated.

B: Entering of water did not occur.

C: Entering of water occurred.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Base | Foam |  | Black polyolefin foam (1) | Black polyolefin foam (1) | Black polyolefin foam (1) | Black polyolefin foam (1) | Black polyolefin foam (2) | Black polyolefin foam (3) | Black polyolefin foam (4) | Black polyolefin foam (5) | Black polyolefin foam (6) |
|  | Thickness [μm] |  | 200 | 200 | 200 | 200 | 200 | 200 | 150 | 230 | 500 |
|  | Apparent density [N/cm$^3$] |  | 0.39 | 0.39 | 0.39 | 0.39 | 0.36 | 0.45 | 0.40 | 0.35 | 0.14 |
|  | 25% compressive strength [kPa] |  | 450 | 450 | 450 | 450 | 388 | 332 | 207 | 301 | 98 |
|  | Interlaminar strength [N/cm] |  | 42.4 | 42.4 | 44.2 | 44.2 | 28.4 | 27.4 | 27.0 | 29.4 | 30.0 |
|  | Average bubble diameter [μm] | MD | 80 | 80 | 80 | 80 | 113 | 129 | 143 | 109 | 113 |
|  |  | CD | 87 | 87 | 87 | 87 | 118 | 131 | 132 | 123 | 124 |
|  |  | VD | 27 | 27 | 27 | 27 | 32 | 39 | 27 | 53 | 57 |
|  | Aspect ratio | MD/VD | 3.0 | 3.0 | 3.0 | 3.0 | 3.5 | 3.3 | 5.3 | 2.0 | 2.0 |
|  |  | CD/VD | 3.2 | 3.2 | 3.2 | 3.2 | 3.7 | 3.4 | 4.9 | 2.3 | 2.2 |
|  |  | MD/CD | 0.9 | 0.9 | 0.9 | 0.9 | 1.0 | 1.0 | 1.1 | 0.9 | 0.9 |

TABLE 1-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  | Modulus of | MD | 964 | 964 | 964 | 964 | 883 | 1,072 | 1,022 | 933 | 411 |
|  | elasticity in tension [N/cm²] | CD | 666 | 666 | 666 | 666 | 624 | 675 | 734 | 593 | 245 |
|  | Tensile elongation [%] |  | 669 | 669 | 669 | 669 | 654 | 915 | 555 | 842 | 615 |
| Adhesive | Composition |  | (A) | (A) | (B) | (C) | (A) | (A) | (B) | (B) | (A) |
| layer | Thickness [μm] |  | 50 | 25 | 50 | 50 | 50 | 50 | 50 | 50 | 50 |
|  | Gel fraction [%] |  | 48 | 48 | 37 | 42 | 48 | 48 | 37 | 37 | 48 |
| Adhesive | Thickness [μm] |  | 300 | 250 | 300 | 300 | 300 | 300 | 250 | 330 | 600 |
| tape | Surface adhesive strength [N/4 cm²] |  | 163 | 160 | 200 | 101 | 164 | 171 | 212 | 220 | 166 |
| Drop impact strength |  |  | A | A | A | A | A | A | B | A | B |
| Step followability test |  |  | B | B | B | B | B | B | B | B | B |
| Waterproof test |  |  | B | B | B | B | B | B | B | B | B |

TABLE 2

|  |  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 |
|---|---|---|---|---|---|---|---|---|---|---|---|
| Base | Foam | Black polyolefin foam (7) | Black polyolefin foam (8) | Black polyolefin foam (9) | Black polyolefin foam (10) | Black polyolefin foam (11) | Black polyolefin foam (12) | Black polyolefin foam (13) | Black polyolefin foam (7) | Non-woven fabric | PET |
|  | Thickness [μm] | 140 | 200 | 80 | 100 | 100 | 100 | 100 | 140 | Basis weight: 17 g/cm² | 25 |
|  | Apparent density [N/cm³] | 0.40 | 0.20 | 0.39 | 0.33 | 0.36 | 0.41 | 0.46 | 0.40 | — | — |
|  | 25% compressive strength [kPa] | 130 | 52 | 92 | 70 | 103 | 190 | 270 | 130 | — | — |
|  | Interlaminar strength [N/cm] | 19.1 | 12.9 | 10.2 | 8.9 | 12.6 | 16.2 | 13.6 | 19.1 | — | — |
|  | Average bubble diameter [μm] MD | 147 | 173 | 117 | 189 | 126 | 121 | 94 | 147 | — | — |
|  | CD | 174 | 210 | 225 | 189 | 143 | 158 | 369 | 174 | — | — |
|  | VD | 33 | 42 | 9 | 27 | 20 | 25 | 31 | 33 | — | — |
|  | Aspect ratio MD/VD | 4.5 | 4.1 | 12.4 | 7.0 | 6.3 | 4.8 | 3.0 | 4.5 | — | — |
|  | CD/VD | 5.3 | 5.0 | 23.9 | 7.0 | 7.2 | 6.3 | 11.9 | 5.3 | — | — |
|  | MD/CD | 0.8 | 0.8 | 0.5 | 1.0 | 0.9 | 0.8 | 0.3 | 0.8 | — | — |
|  | Modulus of elasticity in tension [N/cm²] MD | 994 | 495 | 1,062 | 799 | 1,084 | 964 | 1,456 | 994 | — | — |
|  | CD | 713 | 412 | 962 | 627 | 790 | 861 | 956 | 713 | — | — |
|  | Tensile elongation [%] | 535 | 445 | 465 | 458 | 508 | 490 | 656 | 535 | — | — |
| Adhesive layer | Composition | (A) | (A) | (A) | (A) | (A) | (A) | (A) | (B) | (C) | (A) |
|  | Thickness [μm] | 80 | 50 | 15 | 50 | 50 | 50 | 50 | 80 | 80 | 88 |
|  | Gel fraction [%] | 48 | 48 | 48 | 48 | 48 | 48 | 48 | 37 | 42 | 48 |
| Adhesive tape | Thickness [μm] | 300 | 300 | 110 | 200 | 200 | 200 | 200 | 300 | 200 | 200 |
|  | Surface adhesive strength [N/4 cm²] | 160 | 163 | 142 | 140 | 145 | 166 | 172 | 200 | 110 | 140 |
| Drop impact strength |  | C | D | D | D | C | C | C | C | C | C |
| Step followability test |  | B | B | C | B | B | B | B | B | C | C |
| Waterproof test |  | B | B | C | B | B | B | B | B | C | C |

Com. Ex.: Comparative Example

As shown in Examples 1 to 7 above, it was clear that the adhesive tapes of the present invention have both excellent drop impact resistance and excellent followability to an adherend. In contrast, regarding each of the adhesive tapes of Comparative Examples 1 to 8, the average bubble diameters of the foam base are large and the interlaminar strength is low, and thus the adhesive tapes do not have sufficient resistance to drop impact in practical use. The double-sided adhesive tapes of Comparative Examples 9 and 10 had poor followability. Accordingly, entering of water was observed in the waterproof test, and a waterproofing property could not be realized.

REFERENCE SIGNS LIST

1 double-sided adhesive tape
2 acrylic board
3 ABS board
4 hole
5 probe
11 double-sided adhesive tape
12, 13 acrylic board
14 weight
15 jig
16 double-sided adhesive tape for fixing
21 double-sided adhesive tape 22, 23 acrylic board
24 single-sided tape for forming step
25 followability evaluation position

The invention claimed is:

1. An adhesive tape for portable electronic devices comprising:
   a foam base; and
   an adhesive layer disposed on at least one surface of the foam base, wherein
   an average bubble diameter in a machine direction and an average bubble diameter in a cross-machine direction of the foam base are each 150 µm or less,
   a ratio represented by the average bubble diameter in the machine direction/an average bubble diameter in a vertical direction and a ratio represented by the average bubble diameter in the cross-machine direction/the average bubble diameter in the vertical direction are each 6 or less,
   the foam base has an interlaminar strength of 20 N/cm to 150 N/cm,
   the foam base has a 25% compressive strength of 80 kPa or more and a thickness of 150 µm to 1,000 µm,
   the adhesive layer includes an acrylic copolymer and 18.8 parts to 60 parts by mass of a tackifier resin based on 100 parts by mass of the acrylic copolymer, and
   the acrylic polymer is prepared from 80-98.5 mass % of a (meth) acrylate having 1 to 12 carbon atoms.

2. The adhesive tape according to claim 1, wherein the foam base has an apparent density of 0.3 to 0.5 g/cm$^3$.

3. The adhesive tape according to claim 1, wherein the foam base is a polyolefin foam base.

4. The adhesive tape according to claim 1, fixing a component of a portable electronic device.

5. The adhesive tape according to claim 4, wherein the component of the portable electronic device is an information display device, a touch panel, or a panel that protects an information display unit, the information display device, the touch panel, or the panel having a diagonal length of 3.5 to 16 inches.

6. The adhesive tape according to claim 1, wherein the foam base has moduli of elasticity in tension in the machine direction and in the cross-machine direction of 800 N/cm$^2$ to 1,500 N/cm$^2$.

7. The adhesive tape according to claim 1, wherein the foam base has an independent bubble structure to block water penetration through a cross-section of the foam base.

8. The adhesive tape according to claim 1, wherein the 25% compressive strength is in a range from 80 kPa to 700 kPa.

9. The adhesive tape according to claim 1, wherein the 25% compressive strength is in a range from 170 kPa to 600 kPa.

10. The adhesive tape according to claim 1, wherein the 25% compressive strength is in a range from 270 kPa to 500 kPa.

11. The adhesive tape according to claim 1, wherein the foam base has a tensile of elongation in the machine direction of 200% to 1,500%.

12. The adhesive tape according to claim 1, further comprising an adhesive disposed on both major surfaces of the foam base, wherein the adhesive includes, as a base polymer, a (meth)acrylate alone or an acrylic copolymer composed of a copolymer of a (meth)acrylate and other monomers and a rosin ester tackifying resin.

13. The adhesive tape according to claim 1, wherein the acrylic copolymer has a weight-average molecular weight of 1,600,000 to 2,500,000.

14. The adhesive tape according to claim 1, wherein the adhesive layer has a loss tangent (tan δ) peak value at a frequency of 1 Hz at −16° C. to 15° C.

* * * * *